United States Patent

Wagner et al.

[11] Patent Number: 4,899,540
[45] Date of Patent: Feb. 13, 1990

[54] MUFFLER APPARATUS WITH FILTER TRAP AND METHOD OF USE

[75] Inventors: Wayne M. Wagner, Apple Valley; Douglas E. Flemming, Rosemount, both of Minn.

[73] Assignee: Donaldson Company, Inc., Minneapolis, Minn.

[21] Appl. No.: 109,155

[22] Filed: Oct. 15, 1987

Related U.S. Application Data

[63] Continuation-in-part of Ser. No. 88,055, Aug. 21, 1987, Pat. No. 4,851,015.

[51] Int. Cl.⁴ .............................................. F01N 3/02
[52] U.S. Cl. ...................................... 60/274; 60/286; 60/303; 55/282; 55/283; 55/466; 55/DIG. 30
[58] Field of Search ........................ 60/274, 286, 303; 55/282, 283, 466, DIG. 30

[56] References Cited

U.S. PATENT DOCUMENTS

| | | |
|---|---|---|
| 3,723,070 | 3/1973 | Houdry . |
| 3,768,982 | 10/1973 | Kitzner et al. . |
| 4,319,896 | 3/1982 | Sweeney . |
| 4,404,794 | 9/1983 | Oishi .................... 60/274 |
| 4,404,796 | 9/1983 | Wade et al. . |
| 4,427,418 | 1/1984 | Kogiso et al. . |
| 4,450,682 | 5/1984 | Sato ........................ 60/286 |
| 4,455,823 | 6/1984 | Bly et al. . |
| 4,494,375 | 1/1985 | Rao et al. . |
| 4,512,786 | 4/1985 | Sakurai et al. . |
| 4,516,993 | 5/1985 | Takeuchi . |
| 4,519,820 | 5/1985 | Oyobe . |
| 4,531,363 | 7/1985 | Ludecke . |
| 4,538,411 | 4/1985 | Wade et al. . |
| 4,538,412 | 9/1985 | Oishi et al. . |
| 4,544,388 | 10/1985 | Rao . |
| 4,548,625 | 10/1985 | Ishidia et al. . |
| 4,562,695 | 1/1986 | Rao et al. . |
| 4,573,317 | 3/1986 | Ludecke . |
| 4,641,496 | 2/1987 | Wade . |
| 4,655,037 | 4/1987 | Rao et al. . |
| 4,670,020 | 6/1987 | Rao et al. . |
| 4,671,058 | 6/1987 | Yoshida et al. . |
| 4,678,827 | 8/1987 | Wade et al. . |

OTHER PUBLICATIONS

Brochure "Make Progress with Corning" Corning Glassworks.
Technical Report No. 13164 "Development of a Pulse Jet Self Cleaning Air Filter (PJ-SCAF) for the M60 Tank" Bruce A. Hampel (pp. A-10, A-11).
Report L-2746 "Electrical Regeneration of a Large Segmented, EX-47 Filter for Underground Mining Application", S. T. Gualti & B. Justice.
Article 850014 "Advanced Techniques for Thermal and Catalytic Diesel Particulate Trap Regeneration" Rao et al.
Article 850152 "Electric Regeneration of Ceramic Wall-Flow Diesel Filters for Underground Mining Applications" Vergeer et al.
Article 860290 "Study on Catalytic Regeneration of Ceramic Diesel Particulate Filter" Yoshinori Niura et al.

*Primary Examiner*—Douglas Hart
*Attorney, Agent, or Firm*—Merchant, Gould, Smith, Edell, Welter & Schmidt

[57] ABSTRACT

Muffler-filter apparatus for reducing both sound and particulates from exhaust gases from an engine. The apparatus includes resonating chambers, flow distribution means and a cellular ceramic core filter module. Filter regeneration mechanism includes a heating element for heating the carbon on the inlet end of the ceramic core to combustion temperature. Particulate ignition resulting in regeneration occurs when combustion air is provided. In alternate embodiments, combustion air first flows through a preheater system. A processor unit with particular logic controls the apparatus. The particular method of regeneration depends on the application in which the muffler-filter is used.

8 Claims, 18 Drawing Sheets

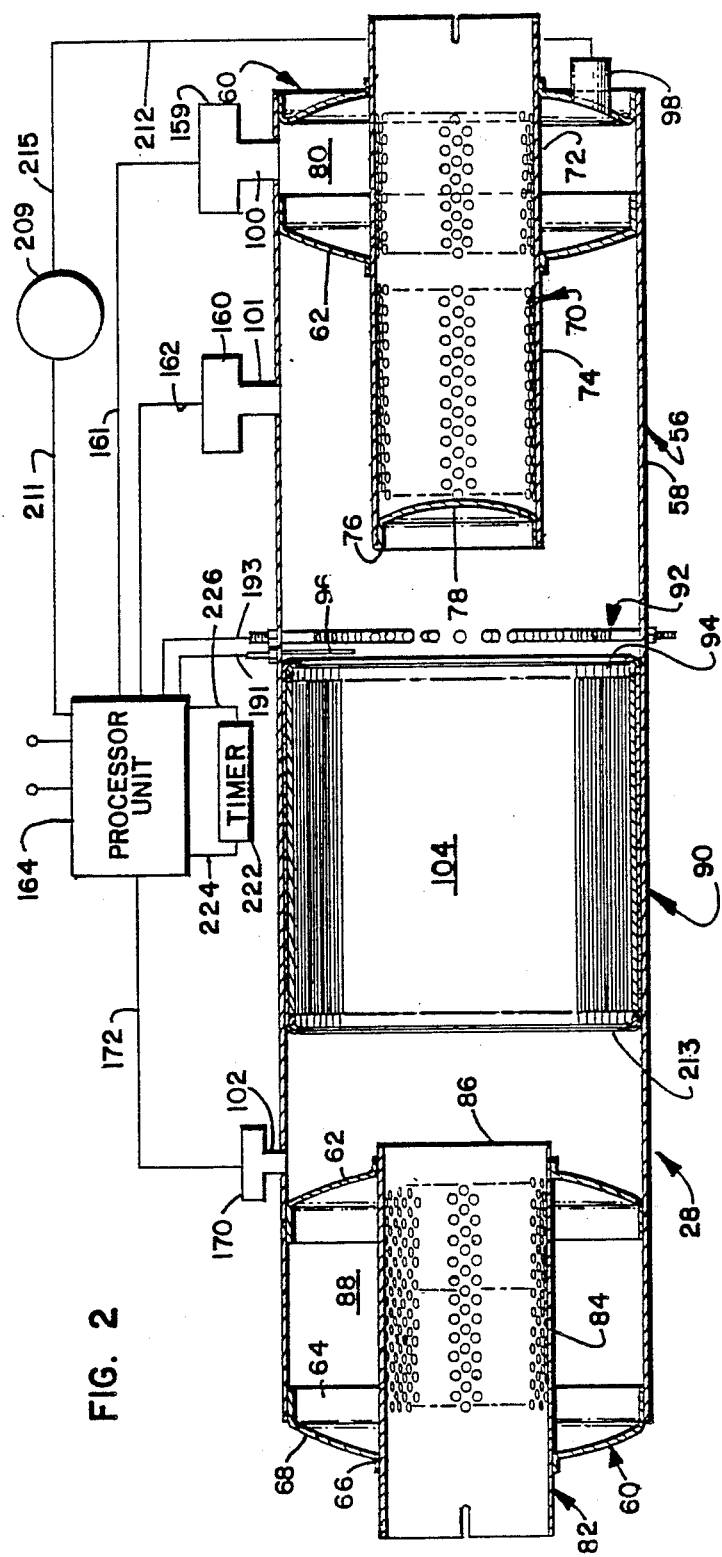

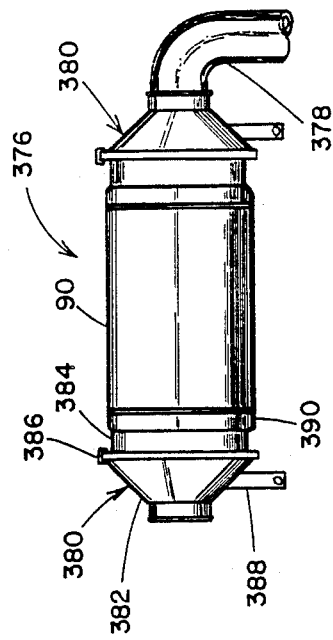
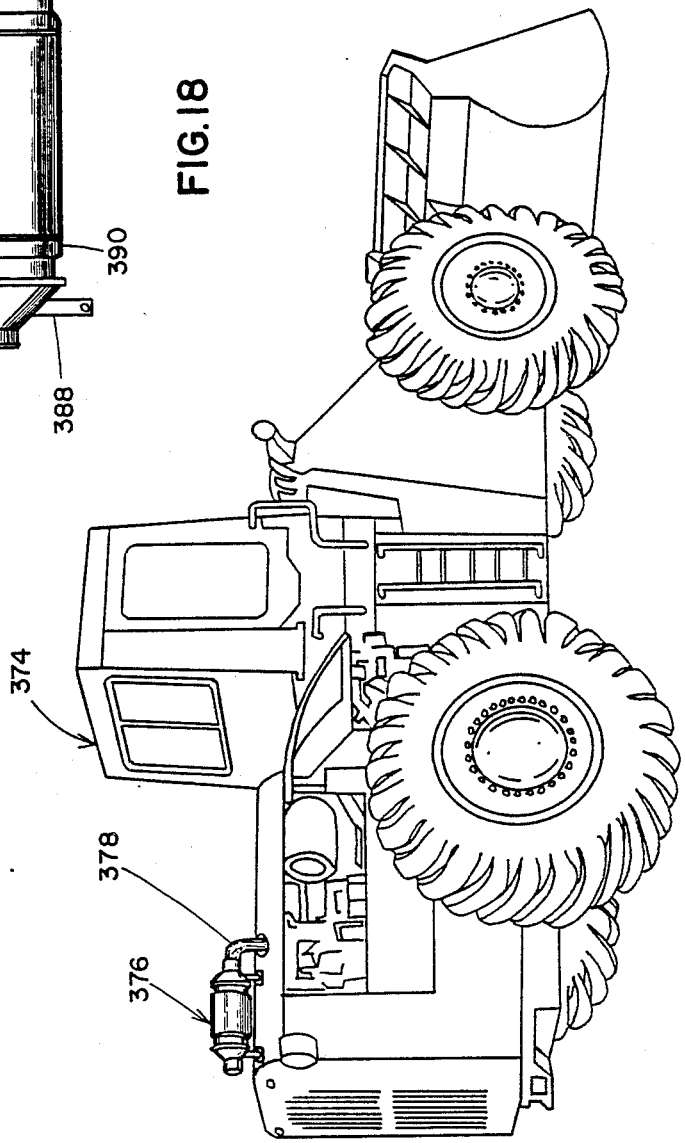
FIG. 18
FIG. 17

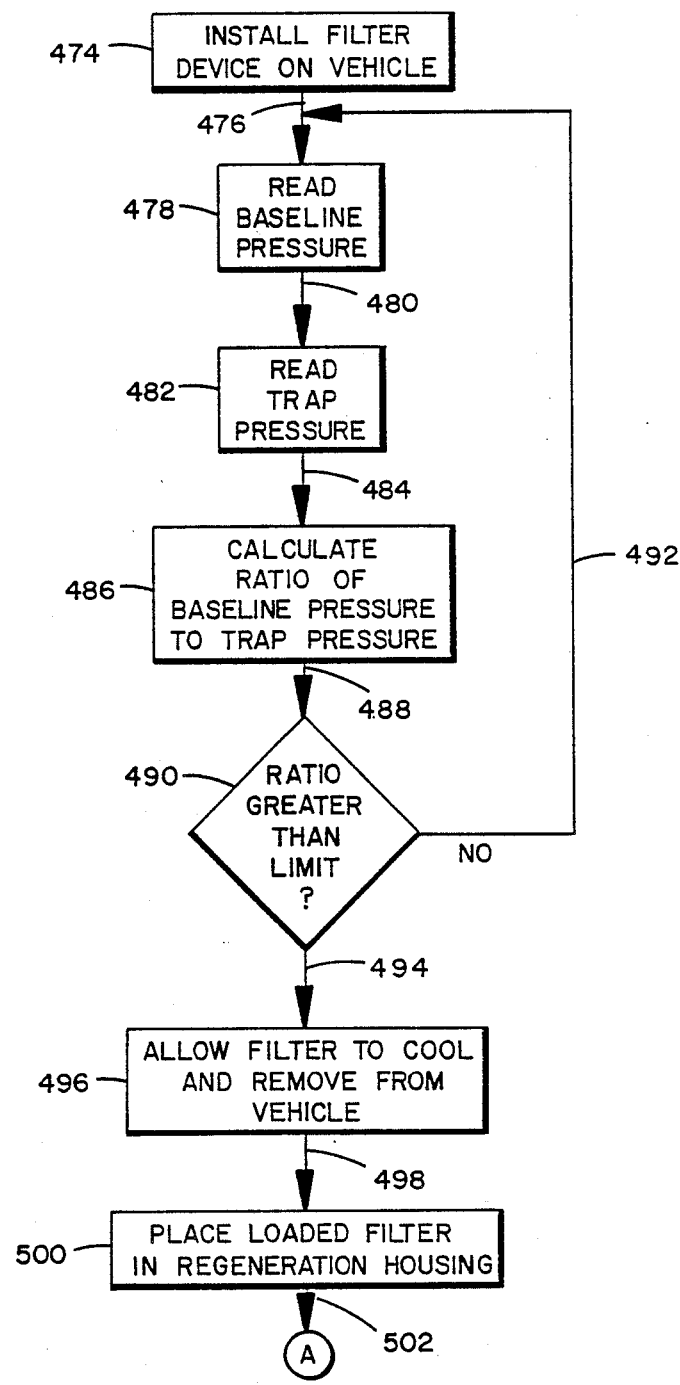

MUFFLER APPARATUS WITH FILTER TRAP AND METHOD OF USE

This application is a Continuation-In-Part of U.S. patent application Ser. No. 07/088,055, filed Aug. 21, 1987 now U.S. Pat. No. 4,851,015.

FIELD OF THE INVENTION

The invention is directed generally to muffler devices for vehicles, primarily vehicles powered by diesel engines. The muffler includes a filter trap for capturing particulates exhausting from the engine and provides for a regenerating mechanism for oxidizing the particulates and emitting them as a nonpolluting gas.

BACKGROUND OF THE INVENTION

Particulate emissions by diesel-engine vehicles became a subject of great concern to both environmental regulators and the automotive industry during the late 1970's and early 1980's. The concern was prompted by the low supply of oil and the introduction of diesel engines in a greater number of models of passenger cars and light trucks. At the time, it was thought to be a wide trend toward dieselization. Although diesel engines are normally more expensive than gasoline engines, they are also much more efficient and, hence, the value of the higher efficiency propelled their popularity during that period. The prospect of greatly increased numbers of diesel vehicles, especially in urban areas, generated concern about the impact of diesel particulate emissions on ambient air quality. Diesel particulate material is easily respired, incorporates potentially mutagenic and carcinogenic chemicals, and strongly absorbs light leading to degraded visibility in some areas. In response to these concerns, regulations by various agencies were promulgated.

In response to the need to reduce diesel particulate emissions, vehicle and engine manufacturers began to attempt to reduce the amount of particulate matter generated by the engine and/or to remove the particulate matter from the exhaust gas. The latter approach is relevant to the present invention. The latter approach in general uses a device known as a trap-oxidizer. A trap-oxidizer system generally includes a temperature resistant filter (the trap) from which particulates are periodically burned off (oxidized), a process commonly known as regeneration. The traps must be regularly regenerated so as not to become excessively loaded and create an undesirable back pressure thereby decreasing engine efficiency. Since the particulate material captured by the trap is mainly carbon and hydrocarbons, its chemical energy is high. Once ignited, it burns readily and releases a large amount of heat.

Possible traps for capturing diesel particulate emissions primarily include cellular ceramic elements (see U.S. Pat. No. 4,276,071) and catalytic wire-mesh devices (see U.S. Pat. No. 3,499,269). The present invention uses cellular ceramic filter elements.

Trap-oxidizer regeneration systems can be divided into two major groups on the basis of control philosophy. One group is positive regeneration systems; the other group is self-regeneration systems. Positive regeneration systems are relevant to the present invention and have included use of a fuel fed burner (see U.S. Pat. No. 4,167,852), use of an electric heater (see U.S. Pat. Nos. 4,270,936; 4,276,066; 4,319,896; and British published application No. 2,134,407) and detuning techniques which aim to raise the temperature of exhaust gas temperature at selected times (see U.S. Pat. Nos. 4,211,075 and 3,499,260). Self generation systems are directed to the use of fuel-additives containing catalytic metals or the use of catalytic treated traps to lower the ignition temperature of the captured particulates.

Although, as indicated, there has been effort directed to trapping the emission of diesel particulates, a simple, reliable and efficient trap system has not been available. Prior art systems have tended to be an aggregation of items which when linked together theoretically are directed to solving the problem. None of the known systems, however, are directed to the total exhaust problem, that is, both muffling sound and making emissions environmentally acceptable.

SUMMARY OF INVENTION

The present invention is directed to a particulate filter module of a type for trapping diesel particulate emissions and a method of manufacturing the module. The invention is also directed to muffler-filter apparatus which includes the module along with sound attenuating mechanism, as well as a method of using such muffler-filter apparatus.

The particulate filter module of the present invention includes a ceramic filter element enclosed along a side region by a rigid housing. The housing has mechanism for longitudinally retaining the ceramic filter element between opposite ends. The module also has mechanism for cushioning the filter element with respect to the rigid housing and for resisting heat transfer from the filter element to the housing, as well as mechanism for sealing the cushioning mechanism between the filter element and the housing at the opposite ends of the rigid housing in such a way as to be partially compressed between the filter element and the longitudinal retaining mechanism at the ends of the rigid housing which then also puts the ceramic core in axial preload.

The method for making the particulate filter module includes steps of wrapping the side region of the ceramic filter element with an intumescent cushioning and heat resistant material, slipping the wrapped filter element into a housing, placing sealing mechanism at ends of the heat resistant material, and forming inwardly turned ends on the housing to compress a portion of the sealing mechanism between the filter element and the inwardly turned ends.

The present method may be of further advantage in certain cases to include steps of partially prerolling a metallic sheet before slipping the wrapped ceramic filter into it and thereafter squeezing the rolled sheet to a predetermined cylindrical dimension and welding the seam thereof. It may be of still further advantage to heat the completed module before used to cure the intumescent and heat resistant material.

The module is particularly advantageous since it is modular and yet includes many features important to proper use of a cellular ceramic element. In the modular form, the element may be used in a particular housing, removed for regeneration, and stored or installed in the same or a different housing. Additionally, the modular concept leads to simpler manufacture of larger assemblies, such as muffler apparatus.

The prescnt ceramic filter module is also important due to intumescent, heat resistant material about the ceramic element which transversely compresses the ceramic element and contains the heat during regeneration of the element. The material has a diagonal joint so that the seam is not a ready source of leakage. Additionally, the heat resistant material is sealed in place at the ends of the ceramic element.

Of further importance, the housing includes inwardly turned ends which not only compress the seal, but provide an axial, preloaded containment for the ceramic element. Thus, the heat resistant material transversely loads and cushions the ceramic element with respect to side shock. The ends of the housing provide an axial load. Such construction minimizes ceramic cracking, and if cracking occurs, resists crack continuation. In this regard, such construction also allows for different thermal growth of the ceramic element and the metallic housing by providing a transition for different movement of the ceramic element and the metallic housing during thermal cycling. Thus, the present construction provides the advantages of a module and also the advantages of protecting the ceramic element with respect to the environmental conditions it experiences.

In this regard, the method of making the ceramic filter module considers the fragile and brittle characteristics of the components and leads to minimizing defects in the final product. Of particular note is the simultaneous curling of the ends of the housing and equal compressing thereby to the ends of the ceramic element.

The muffler-filter apparatus of the present invention reduces both sound and particulates from exhaust gases of an engine. The apparatus includes a housing within which there are both mechanism for attenuating sound and mechanism for filtering particulates. In this regard, there may also be mechanisms for heating the inlet end of the filtering mechanism and for supplying air to obtain combustion and therefore regeneration, as well as mechanism for controlling the heating and air supply mechanisms.

Of particular advantage then with respect to the present invention is the dual result of filtering particulate from and muffling the sound of exhaust gases. Of further particular import is that the heating mechanism functions to heat primarily by radiation, thus simplifying the heating sub-assembly.

The ceramic filter module is a preferred filtering device for the apparatus. In order to obtain a preferable distribution of particulates radially with respect to the axis of the filter module, the muffler-filter apparatus advantageously includes deflecting mechanism to direct flow of the exhaust gases away from the center portion of the filter module. In this way, during regeneration, heat in the center of the filter does not build excessively and is better distributed thereby further alleviating the possibility of cracking.

Various embodiments provide further advantages with respect to the heating sub-assembly. For example, one embodiment provides for a more rapid and uniform heating of the ceramic element face by directing a low flow of air across the heating element until the face reaches a temperature near the combustion temperature, then the further rise is achieved by radiation only. In this way there is time for temperature across the face to become uniform before combustion starts. Another embodiment provides for an injector to atomize diesel fuel or other liquid combustible onto the heating element to create a flame which at a reduced electrical power consumption creates a very hot heat source thereby rapidly heating the face of the heating element. A further embodiment provides a reflecting surface for back scatter radiation so that most of the available heat is kept near the face of the filter element.

Another distinct advantage of the present apparatus is the use in some embodiments of a resonating chamber to hold heat storage granules along with a preheating element for the purpose of preheating combustion air directed therethrough during the regeneration of the ceramic filter element.

Also, the present apparatus advantageously compares a ratio of a baseline differential pressure upstream from the ceramic element to a differential pressure across the ceramic element. The ratio is compared to a predetermined value to determine when sufficient loading is present and regeneration should be started. In this way, exhaust temperature, pressure and flow of the engine have little influence on system control.

The method of using the present muffler-filter apparatus includes the steps of comparing the indicated differential pressure ratio to a predetermined value, and if the comparison results in a triggering relationship, then a diverter valve is functioned to direct exhaust gases away from the flow path through the housing and the heating mechanism is turned on. Although not necessary, air from an air source may be directed at a low flow rate across the heating element toward the ceramic core face as the face heats. At a core face temperature differential below combustion temperature, the air is turned off. After further heating and when the core face reaches combustion temperature, combustion air at a high flow rate is directed into the ceramic core element. A timer is started so that at the end of a timed period, whereupon regeneration should be complete, the diverter valve is opened and the flow of combustion air is stopped. The heaters are turned off after combustion starts and before it ends.

The present method of use is simple and does not require steps unimportant to regeneration and reuse of the muffler-filter apparatus as soon as possible. In fact, in some cases, it may be possible to continue to direct exhaust gases through the muffler-filter apparatus during regeneration, as long as sufficient combustion air is also present.

It is noted that the indicated method is applicable to a muffler-filter apparatus which is permanently installed on a vehicle, like an over-the-road truck. There are other types of installations which require slightly altered use methods. For example, muffler-filter apparatuses may be installed on busses, but the energizing mechanism for regeneration is not on the bus, but rather at a regeneration station, such as the bus garage. When the bus returns from its route, the electrical power, air source, and other wiring for the control device are connected. After regeneration is done, the indicated items are disconnected and the bus again operated with a clean filter trap.

Also, as indicated earlier, there are applications, such as on mining equipment, etc., wherein it is more appropriate to remove a loaded filter trap and install a new one. In this case, the loaded filter is carried to a regeneration station and regenerated without making the vehicle inoperable since a previously regenerated filter can be installed.

The present invention is thusly summarized, and many advantages of the invention have been indicated. The invention and its advantages may be better understood, however, by reference to the drawings briefly described hereinafter and the detailed description of a preferred and other embodiments following thereafter.

BRIEF DESCRIPTION OF THE DRAWINGS

FIG. 2 is a cross-sectional view of muffler filter apparatus in accordance with the present invention and also schematically illustrates a control system for the apparatus;

FIG. 17 illustrates a construction vehicle having a filter trap in accordance with the present invention;

FIG. 18 is a side view of the muffler-filter apparatus shown in FIG. 17;

FIGS. 21A–C show a logic diagram for a ceramic filter which is removable from its housing.

DETAILED DESCRIPTION OF THE PREFERRED EMBODIMENTS

Figure 1:
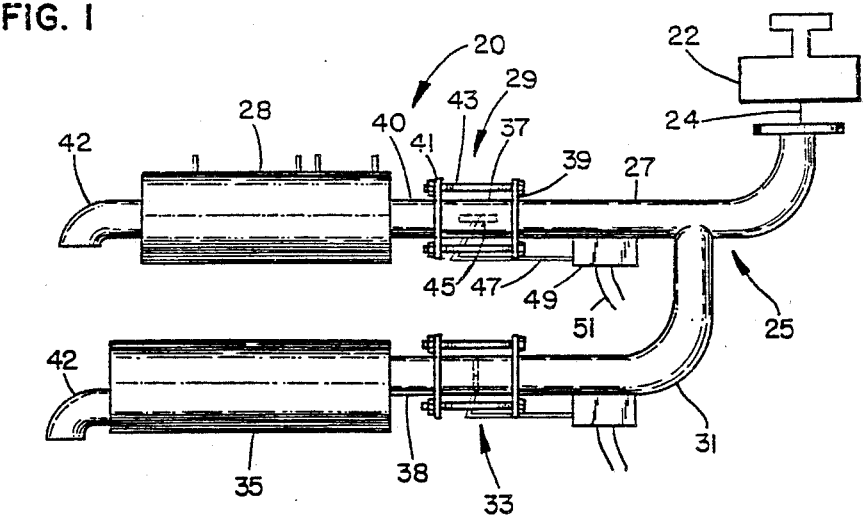
FIG. 1 is an illustration of an exhaust system having a muffler-filter apparatus in parallel with a conventional muffler in accordance with the present invention.

Referring now to the drawings wherein like reference numerals designate identical or corresponding parts throughout the several views, and more particularly to FIG. 1, an exhaust system of the type which can trap diesel particulate emissions as addressed by the present invention is designated generally by the numeral 20. Exhaust system 20 is illustrated to be in fluid communication with diesel engine 22 via line 24. Line 24 leads to connecting pipe 25 which includes a split so that one line 27 connects with valve 29 while the other leg 31 connects with valve 33. Valve 29 is connected via line 40 with muffler-filter apparatus 28 which leads to one tail pipe 42. Valve 33 connects with line 38 leading to muffler 35 and then a second tail pipe 42.

Valves 29 and 33 are preferably two-way conventional brake valves modified only in that leakage across the gate is necessary in the usual application, while in the present invention any leakage is eliminated. Considering valve 29, it typically includes a tubular portion 37 having opposite ends for fitting into seats (not shown) in flanges 39 and 41. Tubular portion 37 is clamped between flanges 39 and 41 by a plurality of nut and bolt combinations 43 which extend between the flanges. Valve 29 includes a pivotable gate 45 connected by linkage 47 to an actuator 49. Actuator 49 may be operated hydraulically, pneumatically, by vacuum, electrically, mechanically or by any other suitable means. Lines 51 illustrate a connection to a control mechanism (not shown). The control mechanism preferably provides for synchronization between valves 29 and 33, although mechanical linkage may also serve that function.

A control logic for system 20 has valve 29 open and valve 33 closed during normal operation so that exhaust gases flow from motor 22 through line 24 and leg 27 of connecting pipe 25, and through valve 29 and line 40 to muffler-filter apparatus 28 and then tail pipe 42. In this way, the sound due to the exhaust gases is attenuated and particulates are removed. When it is sensed, as described in more detail hereinafter, that the filter of apparatus 28 should be regenerated, valve 29 is closed and valve 33 is opened. In this way, the regeneration system of apparatus 28 can function, while the sound of the exhaust gases is muffled in muffler 35 by passing alternatively through leg 31 of connecting pipe 25 and then to valve 33 and line 38 for input to muffler 35 and output at tail pipe 42. The concept of system 20 is that for most of the system operational time, exhaust gases pass through muffler-filter apparatus 28 and are cleaned so as to exceed regulations. During the short regeneration time, the exhaust gases are not cleaned, although acceptable sound attenuation continues to occur. In any case, when the particulate level of total exhaust gases emitted from apparatus 28 and muffler 35 is averaged, the particulate level exhausted is well within regulations.

Figure 1A:
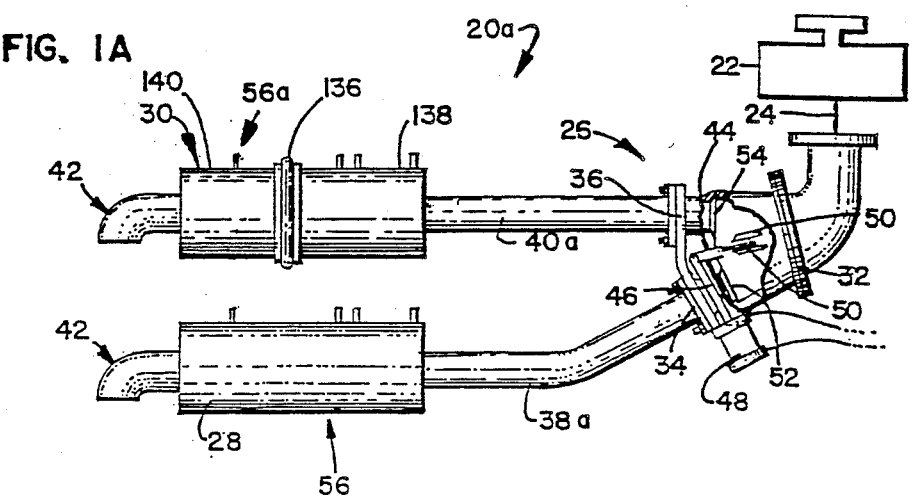
FIG. 1A is an alternate embodiment of an exhaust system which includes muffler-filter apparatus in parallel.

Alternate system 20A in FIG. 1A provides sound attenuation and filtering functions at all times. System 20A is illustrated to be in fluid communication with diesel engine 22 via line 24. Line 24 leads to a diverter valve 26 and filter-muffler apparatuses 28 and 30 in parallel. Diverter valve 26 has a single inlet 32 with a pair of outlets 34 and 36. Inlet 32 is in fluid communication through line 24 with engine 22. Outlet 34 is in fluid communication through line 38a with muffler-filter apparatus 28. Outlet 36 is in fluid communication through line 40a with muffler-filter apparatus 30. As shown, muffler-filter apparatuses 28 and 30 each have ceramic filter modules 90. Muffler-filter apparatuses 28 and 30 also have tailpipes 42.

Valve 26 functions to divert exhaust gases from one muffler-filter apparatus to another so that when one filter module is being regenerated, exhaust gases do not pass to atmosphere without being filtered, but rather must first pass through the filter module in the other muffler-filter apparatus. A typical diverter valve 26 as shown in FIG. 1 may be of a three way diverter type which includes a pivot arm 44 controlled by a plunger arm 46 of a solenoid or air cylinder 48. Sealing disks 50 are attached to opposite sides of one end of pivot arm 44 to mate with either seat 52 leading to outlet 34 or seat 54 leading to outlet 36. Thus, with plunger arm 46 fully drawn into actuator 48, one of sealing disks 50 closes seat 54 and prevents exhaust emissions from further flowing through muffler-filter apparatus 30. On the other hand, with plunger arm 46 fully extended from solenoid 48, the other of sealing disks 50 fits into seat 52 and opens exhaust gas flow to muffler-filter apparatus 30 while closing exhaust gas flow to muffler-filter apparatus 28. With plunger arm 46 midway between extremes of movement, sealing disks 50 close neither fluid communication path so that emissions from engine 22 may exhaust partially through both muffler-filter apparatuses 28 and 30.

A typical muffler-filter apparatus, for example 28, in accordance with the present invention is shown in more detail in FIG. 2. Apparatus 28 includes housing 56 comprising a cylindrical wall 58 with opposite end walls 60 and interior baffle members 62. Each of end walls 60 and baffle members 62 are formed to have an outer circular flange 64 to be fastened to wall 58 along its interior and are also formed to have an inner circular flange 66 which forms an axially aligned opening. The wall 68 extending between flanges 64 and 66 is preferably formed to have a symmetric curvature to provide appropriate structural strength. Walls 68 of each pair of end walls 60 and baffle members curve convexly outwardly from one another.

An inlet pipe 70 is attached to and held by flanges 66 of the right-most pair of end wall 60 and baffle member 62. Pipe 70 is welded or otherwise fastened to be a part of line 38 which is in fluid communication through valve 26 and line 24 with engine 22. Inlet pipe 70 is perforated with a plurality of first openings 72 in a region between end wall 60 and baffle member 62 and is also perforated with a set of second openings 74 in a region between baffle wall 62 and the end 76 of inlet pipe 70. A closure member 78 prevents fluid communication from end 76 of inlet pipe 70. In this way, the chamber 80 formed between end wall 60 and baffle member 62 functions acoustically as a resonating chamber since openings 72 allow exhaust gases to flow therethrough and be muffled therein. Openings 74 allow exhaust gases to flow therethrough to a second chamber formed between baffle members 62 which functions acoustically as an expansion chamber and wherein filter module 90 is contained.

Similarly, an outlet pipe 82 is attached to and held by inner flanges 66 of the left-most pair of end wall 60 and baffle member 62. Outlet pipe 82 is fastened to exhaust tailpipe 42. Outlet pipe 82 includes a plurality of third openings 84 so that gases entering interior end 86 may flow through openings 84 and be muffled within third chamber 88 which then also functions acoustically as a resonating chamber, third chamber 88 being formed between end wall 60, baffle member 62 and outlet pipe 82.

A ceramic filter module 90 is fastened to cylindrical wall 58 between the interior ends 76 and 86 of inlet and outlet pipes, 70 and 82 by friction fit, weld, bracket or other known mechanism (not shown). A heating element 92 is also attached in a known fashion to wall 58 between interior end 76 of inlet pipe 70 and filter module 90, and preferably in close proximity to the inlet end 94 of filter module 90 so as to heat the inlet end primarily by radiation. A temperature sensing device 96, such as a thermocouple, is located between heating element 92 and inlet end 94 of module 90. Temperature sensing device 96 senses fluid temperature in the region between heating element 92 and inlet end 94 for a control purpose described more fully hereinafter. Likewise, tube 98 providing fluid communication for combustion air from outside housing 56 into chamber 80 and fittings 100, 101 and 102, located to open into chamber 80 and located upstream and downstream from heating element 92 and filter module 90, but interior from resonating chambers 80 and 88, respectively, are all needed for system control and are explained more fully hereinafter.

It is noted that muffler-filter apparatus 28 includes reactive attenuation chambers in the form of resonating chambers at opposite ends of the housing and an expansion chamber therebetween. The invention is characterized by at least one reactive attenuation element. Such term, of course, is recognized by those skilled in the art to include more than expansion and resonating chambers. A reactive attenuation element is anything designed to attenuate sound by phase cancellation due to reflection so that one wave cancels another by approaching the other. Reactive attenuation is contrasted with passive, absorptive attenuation wherein flow does not pass therethrough, but amplitude is nevertheless damped thereby. Reactive attenuation is further contrasted with dissipated attenuation wherein sound is decreased, but not due to phase cancellation by interference or amplitude reduction due to absorption.

Figure 6:
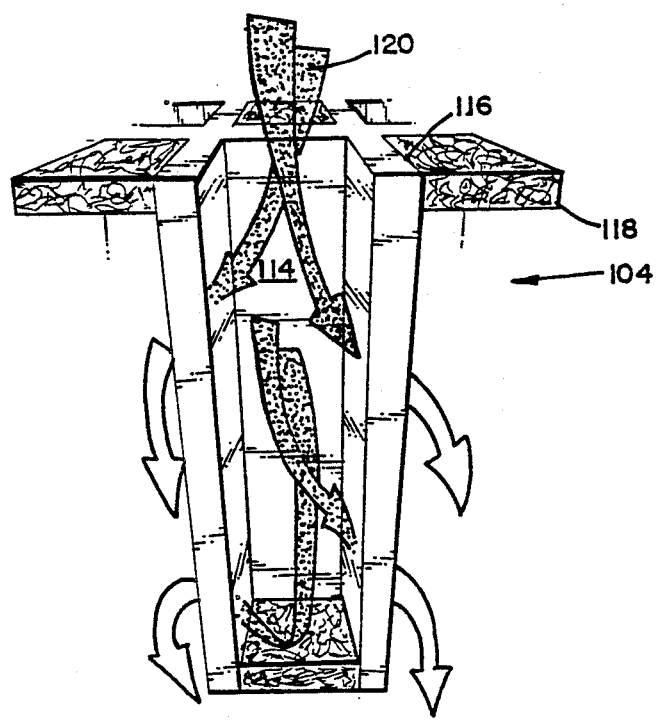
FIG. 6 illustrates the function of air being filtered with a ceramic filter element of the type used in the present invention.
Figure 5:
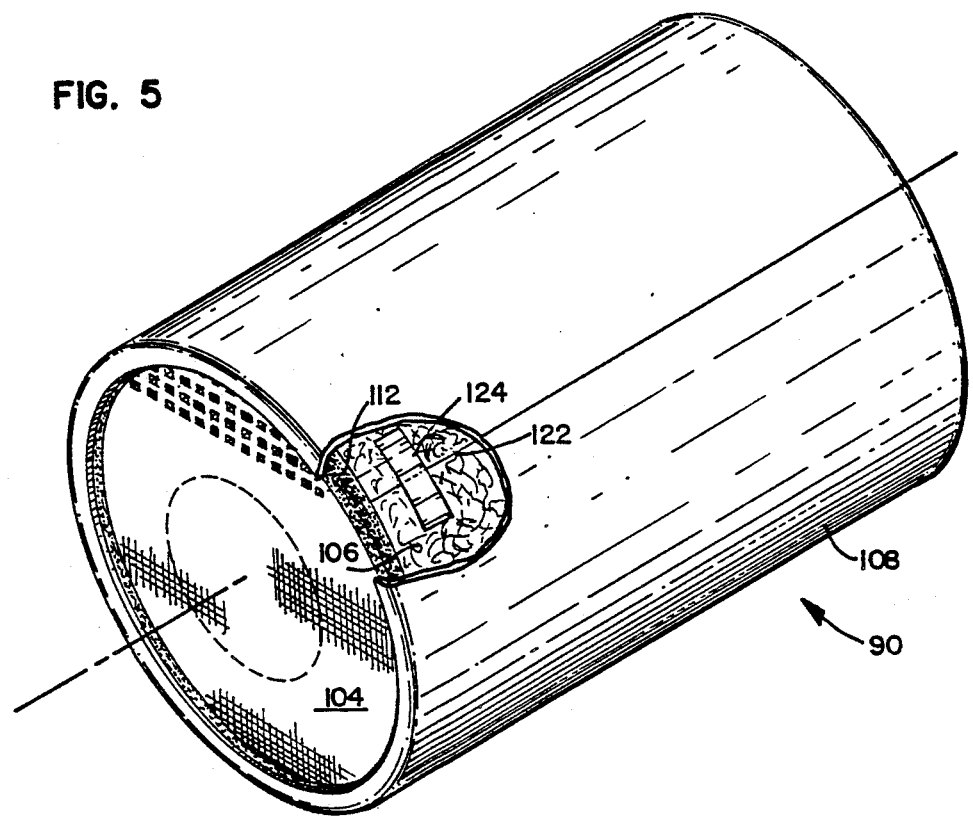
FIG. 5 is a perspective view, partially cut away, of a ceramic filter module in accordance with the present invention.
Figure 7:
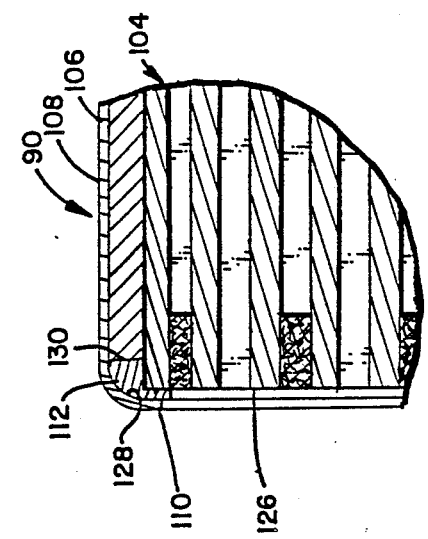
FIG. 7 is a cross-sectional detail view to a portion of the module of FIG. 5.

Ceramic filter module 90 is shown more particularly in FIGS. 5–7. Module 90 includes a cellular ceramic core 104 wrapped in a heat resistant, matted material 106 fitted within a metallic housing 108. The ends 110 of housing 108 are bent inwardly to hold core 104 in a significant axial compression, and a sealing material 112 provides a gasketing function between ends 110 and core 104 and a sealing function with respect to intumescent, heat resistant material 106.

As indicated, the filtration mechanism comprises ceramic core 104. Core 104 is an extruded ceramic which is fired so that the primary crystalline compound is preferably cordierite. Such component is commercially available for example from Industrial Ceramics Department, Ceramic Products Division, Corning Glass Works, Corning, N.Y. 14830. In addition, it is noted that the art of making ceramic filter materials is known, e.g., see U.S. Pat. Nos. 4,340,403; 4,329,162; and 4,324,572. The geometry of core 104 is illustrated in FIG. 6. Square shaped cells 114 are formed as parallel channels running the full length of the part. The walls 116 of channels 114 are porous, which allows them to be used as filter media. Opposite ends of adjacent channels are plugged with a ceramic material 118. This forces exhaust gases 120 through walls 116 so that soot is collected on the walls as the gases pass therethrough. The advantage of this type of construction is that high filtration area is available in a small volume.

Heat resistant material 106 provides both an intumescent, cushioning function for core 104 and a fire retardant, heat resisting barrier between core 104 and rigid housing 108. Material 106 is preferably cut at an angle with respect to a longitudinal axial plane so that mating ends 122 fit one over the other so as to eliminate a longitudinal slot and longitudinal leakage and the formation of a hot spot on housing 108 therealong. The ends 122 of material 106 are held together until placed within housing 108 by a plurality of strips of tape 124 or other equivalent fastening mechanism. A material 106 in sheet form is rather elastic below temperatures on the order of 100° C. Material 106 then provides a cushioning function. As material 106 heats to 100° C. or so and above, it intumesces as allowed and becomes a substantially rigid thermal insulator. At all temperatures, material 106 provides a seal against vapors, smokes and water. Thus, exhaust gases are prevented from exiting along the sidewall of core 104 and are directed through core 104 from the inlet end to the other. The art of making such material is well known, e.g., see U.S. Pat. No. 4,273,879. A representative material 106 is commercially available, for example, from Ceramic Materials Department, 3M Center, St. Paul, Minn. 55144.

As indicated, material 106 provides a cushioning function for ceramic element 104. Before heating, material 106 holds together as a fibrous sheet and is rather elastic. After heating, the binder in material 106 has burned off so that the remainder is fibrous and granular-like. Unless contained, material 106 in the cured state would fall apart. Nevertheless, when contained, material 106 transversely compresses core 104 so that in combination with the axial compression exerted by housing 108, core 104 is securely confined in a fashion to resist cracking or breakage due to normal use environmental conditions.

As indicated, material 106 is wrapped about the side region of core 104. In this configuration, material 106 has longitudinally opposite ends. The opposite ends are spaced from the inwardly turned ends 110 of housing 108. This creates a pair of circular grooves 128 between the core filter element 104 and housing 108 between the ends 130 of material 106 and the inwardly turned ends 110 of housing 108. The sealing material is fitted within grooves 128. The sealing material is preferably a compressible braided rope of fiberglass. In this way, material 112 may be placed in grooves 128 during the manufacturing process and appropriately deformed to function as a gasket between core 104 and ends 110 of housing 108 and to function as a seal for material 106.

Housing 108 is metallic, preferably an aluminized steel or a stainless steel, of about 18 gauge thickness. The corners of the flat sheet which is formed to become housing 108 are notched so that when ends 110 are formed, the material formed is mainly the overlap layer in the seam area. The edges are welded together.

Figure 8A:
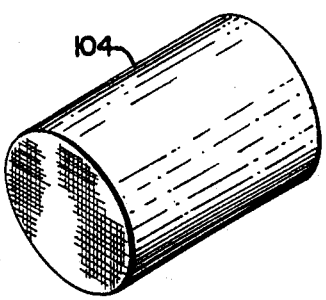
FIGS. 8A–F illustrate a method of making the module of FIG. 5.
Figure 8B:
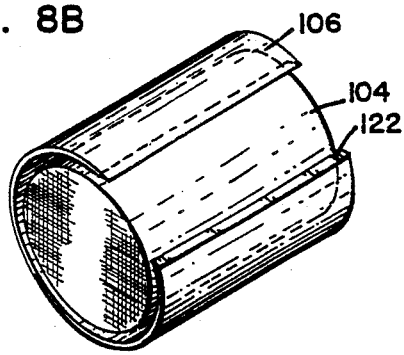
Figure 8C:
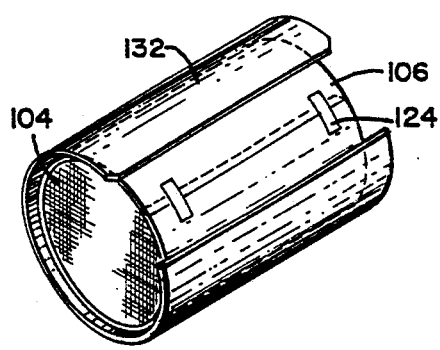
Figure 8D:
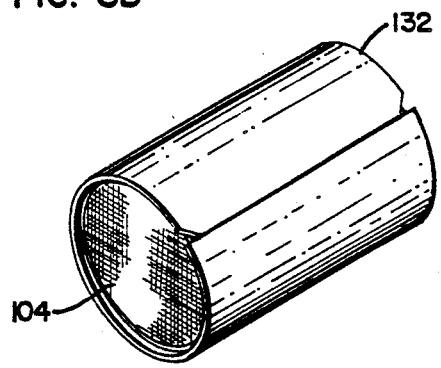
Figure 8E:
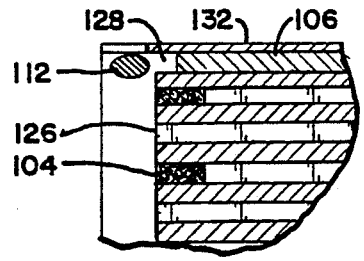
Figure 8F:
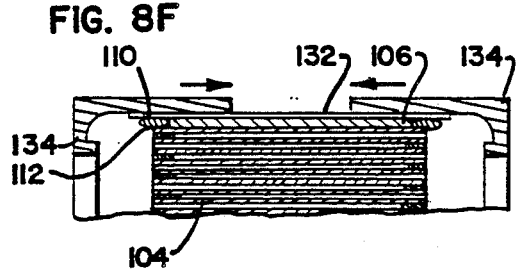

The method of making module 90 is illustrated in FIGS. 8A-8F. A cellular ceramic filter core 104 is shown in FIG. 8A. Core 104 is cylindrical. The matted heat resistant and intumescent cushioning material 106 is wrapped about core 104 as illustrated in FIG. 8B. Matted material 106 has a set of facing ends 122 cut diagonally with respect to a longitudinally axial plane of core 104. The facing ends mate with one another. When facing ends 122 are brought into contact with one another, they are retained with strips of tape 124 or other equivalent fastening mechanism. As shown in FIG. 8C, the wrapped core is then slipped into a prerolled metallic sheet 132 which will be further formed to become housing 108. With wrapped core 104 in place, prerolled sheet 132 is further squeezed or formed to a predetermined cylindrical dimension (see FIG. 8D). As shown in FIG. 8E, material 106 longitudinally does not extend to end 126 of core 104, while rolled sheet 132 extends beyond end 126. Thus, groove 128 is formed. A similar groove is formed at the other end. Sealing rope 112 is placed into grooves 128 at the ends of material 106. Finally, as shown in FIG. 8F, ends 110 of metallic sheet 132 are simultaneously curled inwardly as forming dies 134 are moved together. Dies 134 are moved toward one another with sufficient force (20,000 pounds or so) to curl not only ends 110, but also to put core 104 in significant axial compression. The facing edges of sheet 132 are welded together to form housing 108. Thus, core 104 is rigidly retained not only at its ends, but also by the snugly fitting material 106 held by cylindrically rigid housing 108. Although not always necessary before use, it is preferable as a final step in making module 90 to heat module 90 above 100° C. so that the binder in material 106 is burned off and material 106 uniformly intumesces.

Module 90, as described, or equivalent is attached within housing 56 of muffler-filter apparatus 28 between ends 76 and 86 of inlet and outlet pipes 70 and 82, respectively. Alternately, module 90 may be removably installed in housing 56 as indicated with respect to muffler-filter apparatus 30 in FIG. 1. A cylindrical clamp or other removable fastening mechanism 136 attaches end sections 138 and 140 of housing 56a together.

Figure 4:
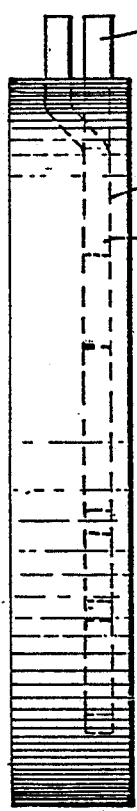
FIG. 4 is a side view of the heating element of FIG. 3.
Figure 3:
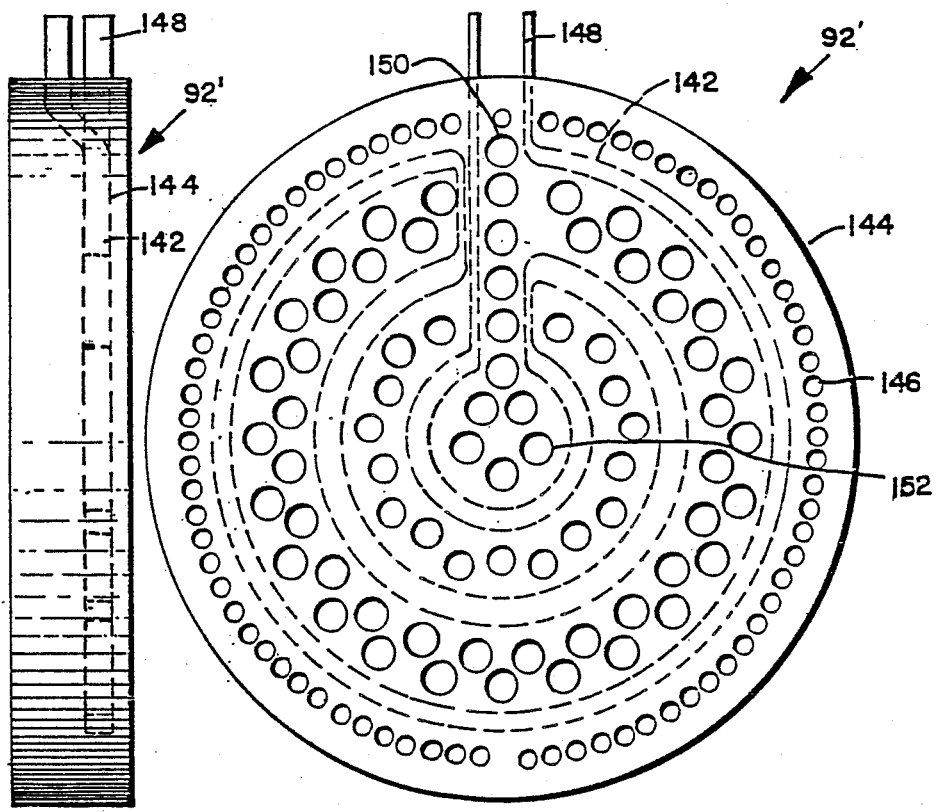
FIG. 3 is a plan view of a heating element of a type which can be used to heat the inlet face of a ceramic filter element in accordance with the present invention.

Heating element 92 which is located in close proximity with inlet end 94 of ceramic filter element 90 preferably provides a substantial amount of radiant heat energy directed toward end 94. In this regard, heating element 92 may be a metallic, electrically resistive element. Alternatively, a heating element 92', as shown in FIGS. 3 and 4, may be an electrically resistive element 142 embedded in a ceramic casting 144. In this regard, it is noted that with respect to alternate embodiments, parts which are the same as the preferred embodiment are denoted with primed numerals, while different parts are given new numerals.

Ceramic casting 144 is formed to include a plurality of rings of a plurality of openings 146 on both sides of the multi-ring heating element 142. Element 142 includes a pair of substantially parallel leads 148 which are also parallel to a radial line of disk-shaped casting 144. Openings 150 are formed between leads 148 and lead to a plurality of openings 152 at the center of casting 144. A sufficient number of various openings in casting 144 must be provided so that heating element 92' does not become a significant restriction with respect to exhaust gases flowing through muffler-filter apparatus 28.

As exhaust emission gases from engine 22 flow through muffler-filter apparatus 28, the gases first flow into inlet pipe 70 for sound attenuation at resonating chamber 80. Gases continue to flow through inlet pipe 70 to perforations 74. Gases are prevented from flowing directly through the outlet end of inlet pipe 70 by closure member 78. Consequently, gases flow from perforations 74 outwardly away from the central portion of housing 56. In this way, the greater flow of exhaust gases pass through the outer openings or spaces of heating element 92 or 92' and into an outer ring of cellular core 104. A greater concentration of particulates is thus formed in such outer ring. Such concentration of particulates in the outer ring is advantageous during regeneration of the ceramic core since heat does not then become concentrated at the center of core 104, but rather is more evenly distributed and even possibly somewhat more intense in the outer ring. Such flow leads to a heat distribution which may be dissipated in a way which minimizes significant uneven expansion or contraction and any resultant cracking. Closure member 78 accomplishes the indicated function as a part of inlet pipe 70 and alleviates any necessity for special flow directing structure adjacent to core 104.

Since module 90 is attached to housing 56 in a way which prevents gases from leaking past it without being filtered by it, gases pass through ceramic core 104 for entry to outlet pipe 82. While passing through outlet pipe 82, sound is attenuated further at the expansion chamber between baffles 62 and at resonating chamber 88.

Figure 11:
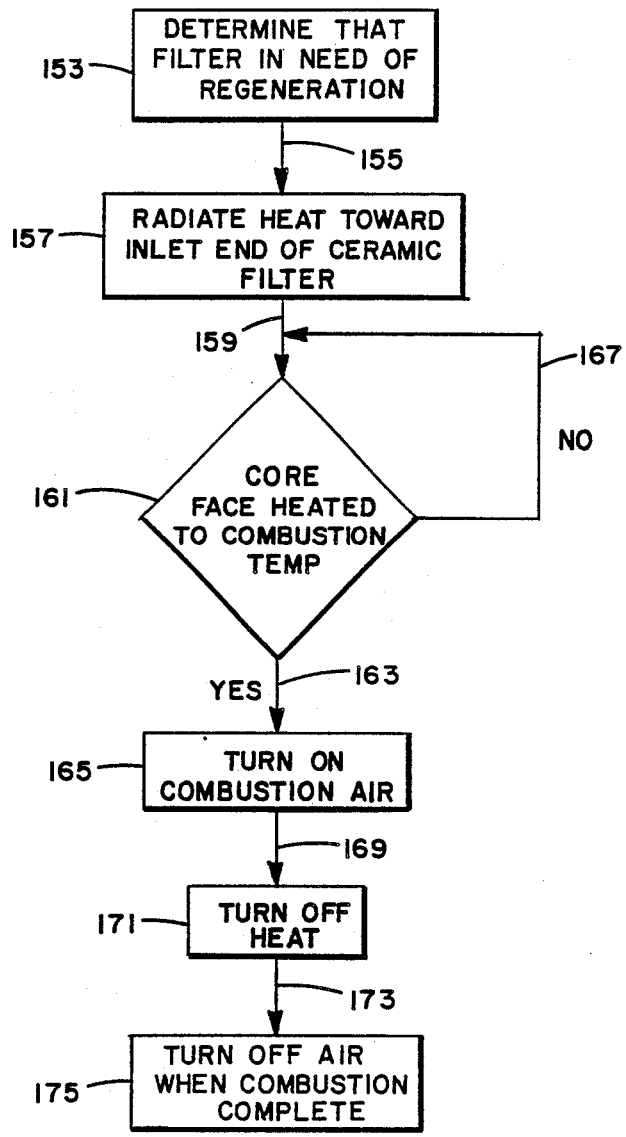
FIG. 11 shows a generalized logic diagram for using an exhaust system in accordance with the present invention.

Over time, filter module 90 traps a great enough quantity of particulates so as to begin to form a pressure restriction of significance. When this occurs, module 90 must be regenerated. A generalized method of regeneration is illustrated in FIG. 11. The first step 153 in regenerating a filter trap in accordance with the present invention is to determine that the filter is in need of regeneration. Such a need for regeneration may be determined from a sensing of pressure differential across module 90 as compared to a baseline measurement. Regeneration may be required due to a passage of time, such as the end of an operational period for a bus. Or, the need for regeneration may be determined from some other method. In any case, the need of step 153 must be established. Next, as shown by line 155, the method leads to step 157 requiring a radiation of heat toward the inlet end of the core 104 of ceramic filter module 90. As indicated by line 159 to step 161, when the core face is heated to the combustion temperature of the particulate material captured by the filter, then combustion air is turned on which is shown by line 163 leading to step 165. Combustion air remains off as indicated by line 167 as long as sensing device 96 senses that the core face has not yet reached the combustion temperature. Some time after combustion air has been turned on so that combustion is initiated and sustained, heating element 92 is turned off as shown by line 169 leading to step 171. When combustion is complete, the air is turned off as indicated by line 173 leading to step 175.

Figure 12A:
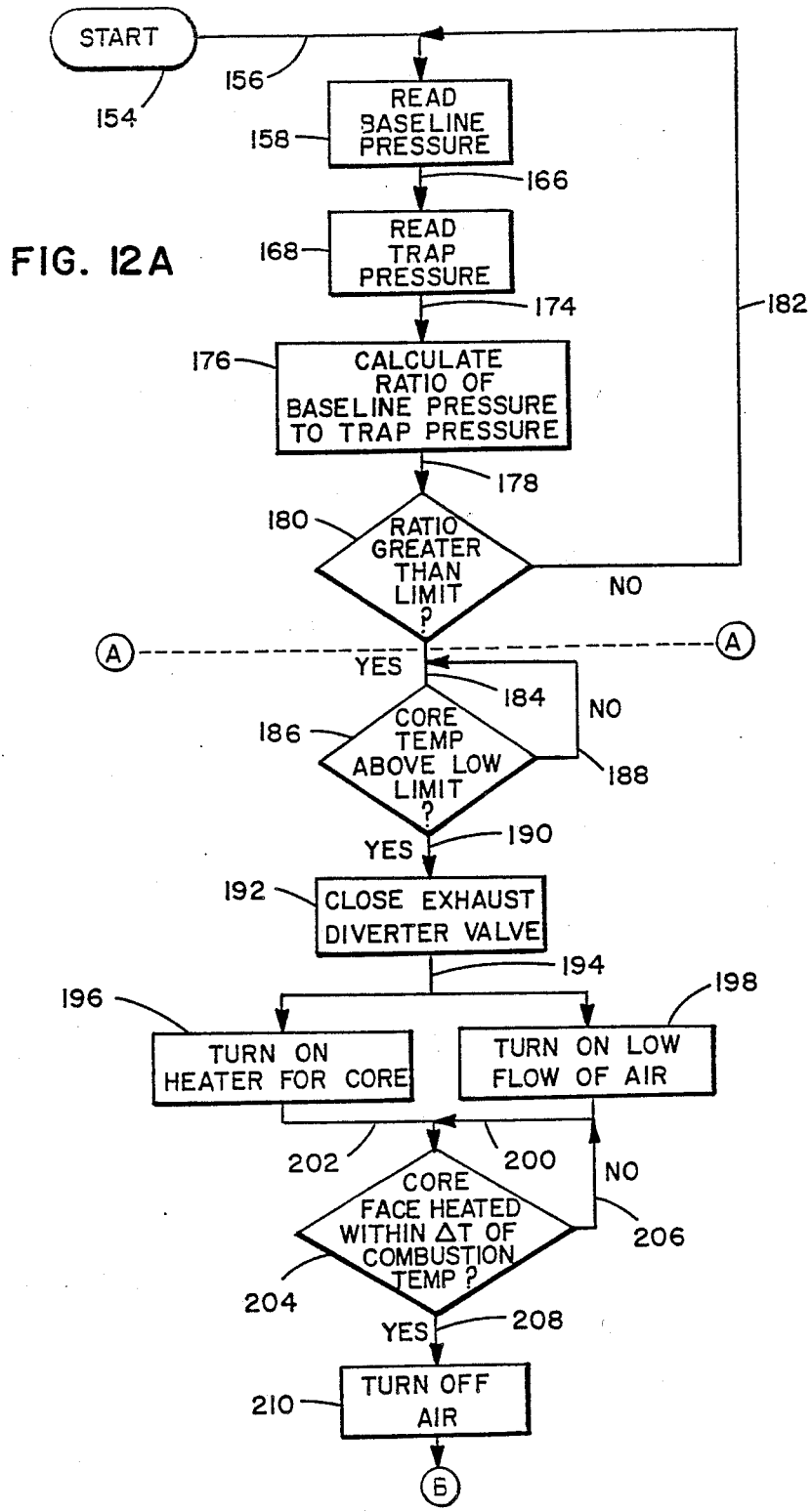
FIGS. 12A–B show a logic diagram for using the exhaust system of FIGS. 1 or 1A.
Figure 12B:
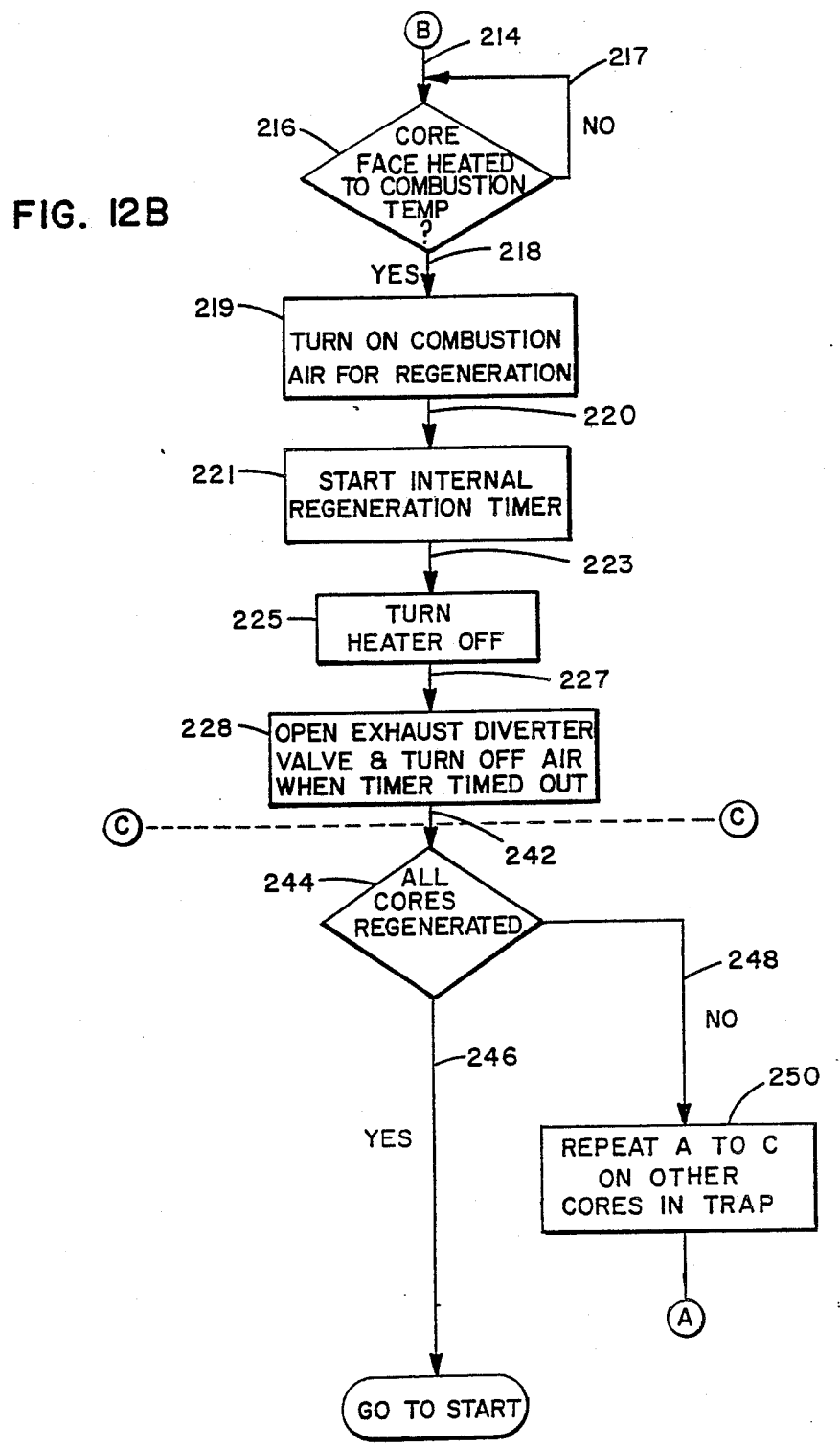

With reference more particularly to the exhaust systems 20 and 20a of FIGS. 1 and 1A, the method of regeneration for them is illustrated by the logic diagram of FIGS. 12A and 12B. As the diagram indicates, the logic begins at "start" box 154 and leads via line 156 to step 158 of reading the base line differential pressure. With reference to FIG. 2, base line differential pressure is obtained with pressure transducers 159 and 160 attached to fittings 100 and 101. Signals representing the pressure values are sent via lines 161 and 162 to a processing unit 164. As further shown in FIG. 2, baseline pressure differential is the pressure differential across inlet pipe 70 by the exhaust flow through perforations 72 and 74 upstream from heating element 92 and filter module 90.

Next, the logic diagram leads via line 166 to step 168 of reading trap differential pressure. Trap differential pressure is obtained with pressure transducers 160 and 170 attached to fittings 101 and 102 which send signals corresponding to the pressure read via lines 162 and 172 to processing unit 164. Trap differential pressure is read across filter module 90 and upstream from outlet pipe 82.

Next, the logic diagram shows line 174 leading to step 176 of calculating the ratio of baseline differential pressure to trap differential pressure. Then, via line 178 leading to step 180, the ratio is compared to a limit value. If the ratio is less than the limit value, then as line 182 shows, the logic is restarted and the pressures are reread and compared as indicated. Line A—A divides the logic related to determining when regeneration is needed from logic related to actual regeneration.

If the ratio is greater than the limit value, then as line 184 indicates leading to step 186, the core temperature or a temperature between core 104 and heating element 92 is determined and compared to a predetermined low limit temperature. This is necessary to make certain that regeneration does not occur when the engine is not running. The temperature is measured by thermocouple or sensing device 96 and sent via line 192 to the processor unit 164. If the temperature is below the limit value, as logic line 188 indicates, the temperature will be resampled. When the core temperature is found to be above the limit value, then logic line 190 leads to step 192 of closing the diverter valve. In the case of system 20, valve 29 would be closed and valve 33 opened. In the case of system 20a, diverter valve 26 would be closed with respect to the particular muffler-filter apparatus to be regenerated.

The logic diagram then shows line 194 leading to parallel steps 196 and 198 which occur preferably at about the same time. Step 196 shows heating element 92 being turned on. Step 198 shows a low flow of air from source 210 being initiated. The low level flow rate is preferably less than half the flow rate of combustion air. The function of the low flow of air is to aid in moving warmed air around heating element 92 to the face of core 104, thereby better utilizing the heat and also to partially warm a depth beyond the face of core 104 by moving some warm air thereinto. It is noted, however, that step 198 is not needed for effective regeneration.

With air on and the core heating, as shown by lines 200 and 202 leading to step 204, temperature is again sensed and compared to a predetermined temperature which is less than the carbon particulate combustion temperature. If the predetermined temperature has not been reached, then as line 206 shows, temperature sensing continues. Once the predetermined temperature is sensed, as line 208 leading to step 210 indicates, the low flow of air is turned off.

It is pointed out that the reduced air flow during warm-up of core 104 assures sufficient core temperature to a sufficient depth to prevent a quench condition for the flame when combustion occurs.

The logic diagram then shows line 214 leading through bubble B to step 216 wherein the temperature sensed by thermocouple 96 is compared to the known combustion temperature of diesel particulates. As indicated hereinbefore, it is understood that the temperature sensed by thermocouple 96 could be the temperature of heating element 92, the temperature of the inlet end 94 of ceramic element 104 or the temperature of the gaseous fluid therebetween. If the temperature is less than the combustion temperature, then as shown by line 217 temperature continues to be sensed. When the sensed temperature is found to have reached the combustion temperature, then as, shown by line 218 leading to step 219 the air compressor 210 or other air source is turned on so that air may flow through line 212 to inlet tube 98. The combustion air from source 209 enters muffler apparatus 28 via line 215 and tube 98 at resonating chamber 80 and flows in perforated openings 72 and out perforated openings 74 to heating element 92 and finally filter core 104. With the temperature high enough and combustion air present, the particulates ignite and begin burning along a flame surface from inlet end 94 to outlet end 213 of core 104 of filter module 90. It is noted that compressor or source 209 is controlled by processing unit 164 via line 211.

As shown by logic line 220 leading to step 221, internal regeneration timer 222 is preferably started at the same time or shortly after thermocouple 96 senses ignition temperature. Timer 222 is in electrical communication with processor unit 164 via lines 224 and 226 as shown on FIG. 2. As indicated in the logic diagram, line 223 leads to step 225 wherein the heating element is turned off some time after combustion air is turned on. Then as shown by line 227 leading to step 228, the diverter valve is opened and the air compressor or source 209 is turned off after the timer times out. It is noted that the time period of timer 222 is sufficiently long to allow complete burning of the particulates in core 104 and, therefore, complete regeneration of core 104, or until sufficient soot is removed to permit safe operation of engine flows.

Line C—C divides the regeneration logic related to regenerating multiple units and/or resetting the just regenerated unit. As shown by logic line 242 leading to decision step 244, the logic sequence is returned via line 246 to start step 154 if the exhaust system has only a single muffler apparatus with a bypass muffler. As shown by logic line 248 leading to step 250, the logic sequence is cycled for a second core, if such is present, as in system 20a of FIG. 1A.

Figure 9:
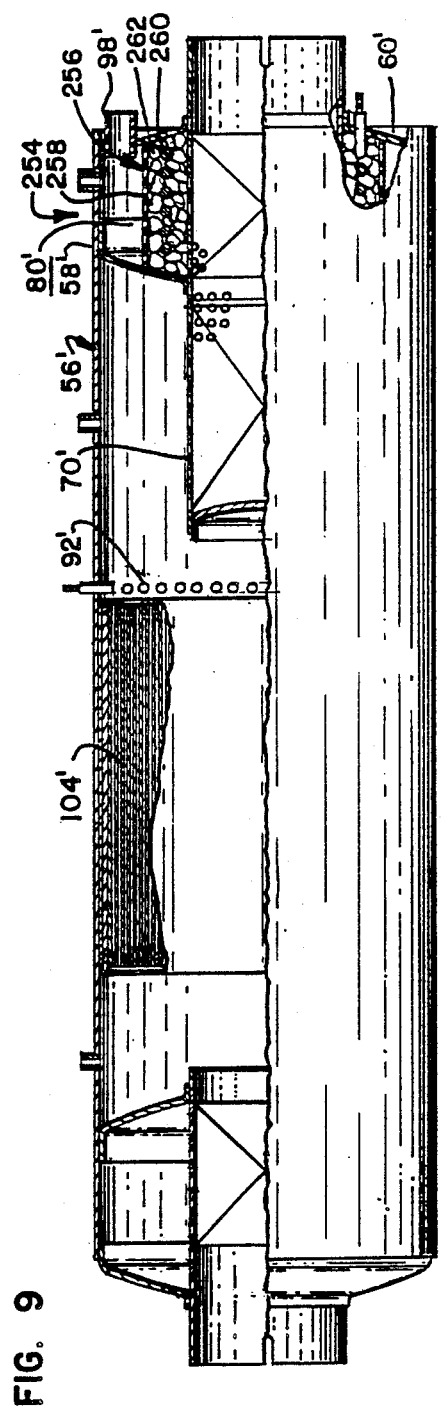
FIG. 9 is a side view in partial cross-section of an alternate embodiment of muffler-filter apparatus in accordance with the present invention.
Figure 10:
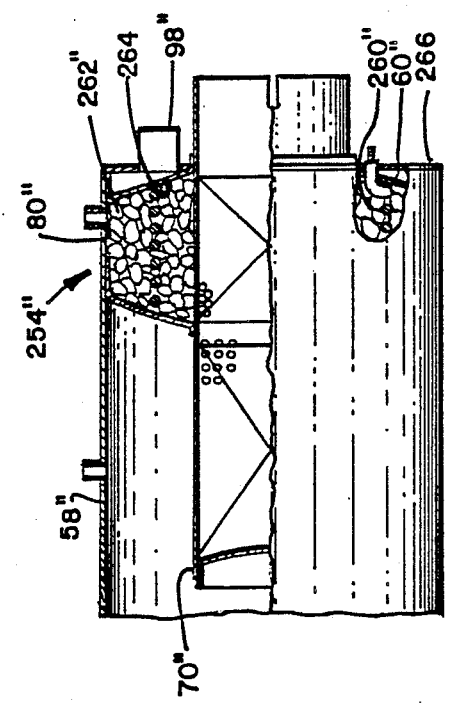
FIG. 10 is another alternate embodiment of muffler-filter apparatus.

It is noted that alternate embodiments as shown in FIGS. 9 and 10 include a combustion air preheating system 254 (FIG. 9) or 254" (FIG. 10). Preheating system 254 is formed in resonating chamber 80'. Preheating system 254 includes a cylindrical wall 256 concentric with inlet pipe 70' and cylindrical wall 58' of housing 56'. Wall 256 is perforated with openings 258 so that combustion air from inlet tube 98' entering the outer annular space may diffuse through openings 258 along the longitudinal and circumferential extent of wall 256. A heating element 260 formed as a double helix is attached to end 60' and fits about midway between inlet pipe 70' and cylindrical wall 256. The space within resonating chamber 80' between inlet pipe 70' and cylindrical wall 256 is filled with a granular, nonmetallic, gravel or ceramic pellet or bead or ball, etc., 262 so as to function as a heat storage bed. Preferably, the granular material 262 has a specific heat greater than the surrounding metal, for example, about 0.2 BTU/LB °F. In this way, heating element 260 heats the granular material, and the combustion air diffuses through it and is substantially heated thereby before flowing into and out of inlet pipe 70' and through heating element 92' to core 104'.

Alternately, as shown in FIG. 10, preheating system 254" may be formed such that granular material 262" completely fills resonating chamber 80". Heating element 260" is preferably a double helix, but larger than the element of FIG. 9 so that it is located approximately half way between inlet pipe 70" and cylindrical wall 58". In this configuration, end 60" is perforated with openings 264. A flat, radial wall 266 is installed outwardly of end 60" so that a small diffusion chamber is formed in an annular, approximately triangular cross-sectional space surrounding inlet pipe 70". Inlet tube 98" is attached to flat outer wall 266 and opens into the annular diffusion space. In this embodiment, combustion air flows in inlet tube 98" to the diffusion space and through perforations 264 to resonating chamber 80". The air is heated as it continues to diffuse through the granulated material 262" past heating element 260" to inlet pipe 70" whereafter the air flows as adequately described hereinbefore.

Preheating systems 254 or 254" are preferably connected with (not shown) and controlled by processor unit 164 and are turned on prior to closing the exhaust diverter valve at step 192 and are left on for a predetermined variable time. The idea is that the granular material 262 is allowed to be heated and store the heat before air is passed therethrough for warming. The heating of the granular material can occur while exhaust gases are still passing through the muffler-filter apparatus.

Figure 13:
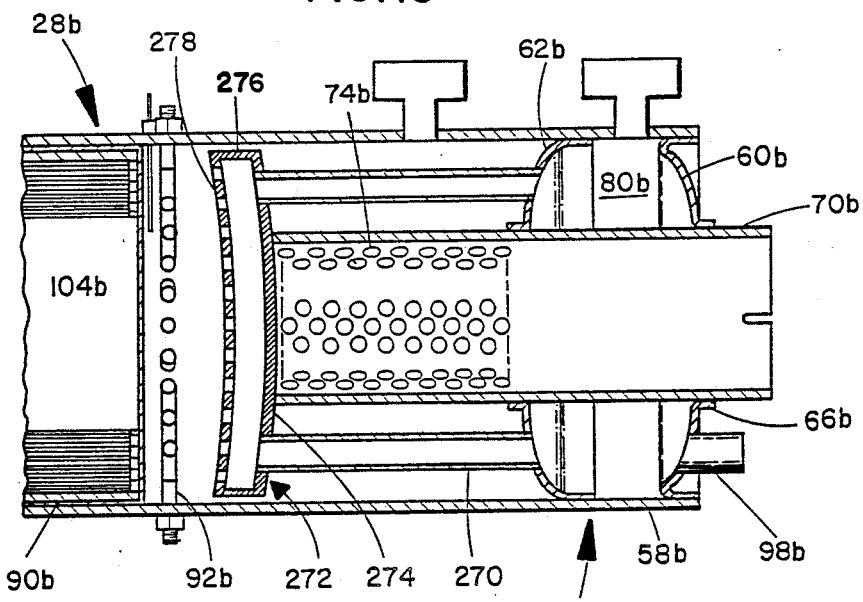
FIG. 13 is another alternate embodiment of the front or inlet portion of muffler-filter apparatus.
Figure 14:
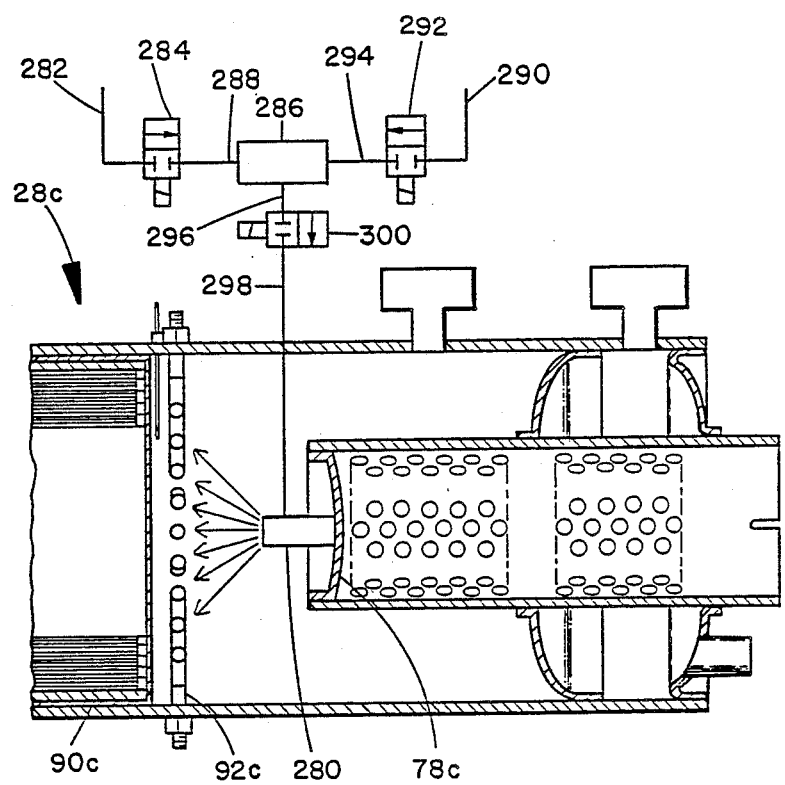
FIG. 14 is yet another alternate embodiment of the front portion.

Alternate inlet ends for a muffler-filter apparatus are shown in FIGS. 13 and 14. With respect to this alternate embodiment, equivalent elements with the preferred embodiment are designated by the same numeral along with the letter "b" for FIG. 13 and the letter "c" for FIG. 14. Housing 56b includes an end wall 60b and an interior baffle member 62b to form a chamber 80b therebetween. Inlet pipe 70b is attached to and held by flanges 66b. Inlet pipe 70b is not perforated to allow fluid communication with chamber 80b, but is perforated downstream from baffle member 62b as shown by opening 74b. As with the preferred embodiment, housing 56b contains a ceramic module 90b and a heating element 92b for heating the carbon on the face of core 104b of module 90b. Embodiment 28b is distinguished from the other embodiments by the closure for inlet pipe 70b and the directing of combustion air to module 90b. In this regard, tube 98b leads from a source (not shown) to chamber 80b. A plurality of tubes 270 extend from baffle 62b to an enclosure 272. Tubes 270 provide fluid communication between chamber 80b and enclosure 272, as well as help support enclosure 272. Enclosure 272 has a side 274 away from module 90b which forms the closure member for inlet pipe 70b. Faced away from side 274 by a wall 276 is a perforated side 278. Enclosure 272 is formed so that wall 276 is spaced somewhat from wall 58b of housing 56b. The gap allows for the flow of exhaust gases from inlet pipe 70b and perforations 74b to bypass enclosure 272 and flow toward module 90b. Combustion air flows in tube 98b to chamber 80b which functions as a manifold for the plurality of tubes 270. Air flows through tubes 270 to enclosure 272 and then out the preferably uniformly distributed openings of perforated side 278 so as to provide a uniform flow toward module 90b.

Embodiment 28c is the same as the preferred embodiment, except a mechanism for atomizing a combustible, preferably diesel fuel, and injecting it onto heating element 92c is shown. When the combustible ignites, a very hot heat source is provided and the face of module 90c may be warmed more quickly. In this way, less electrical power is needed for the heating with element 92c.

An atomizing element 280 is fastened as required to closure member 78c. Appropriate atomizing elements are known to those skilled in the art. Both air and fuel are provided to the atomizing element. This can be done in a number of ways. As shown in FIG. 14, an air line 282 is connected through a normally closed, two-way, two-position solenoid valve 284 to a mixing chamber 286 via a line 288. Similarly, a combustible, like diesel fuel, is directed through a line 290 to a normally closed, two-way, two-position, solenoid valve 292 and then to mixing chamber 286 via line 294. From mixing chamber 286, the mixture is directed via lines 296 and 298 through another normally closed, two-way, two-position, solenoid valve 300 to atomizing element 280.

Alternate exhaust systems and methods of use are shown in FIGS. 15-21. In particular, in FIG. 15 a bus 302 is shown having a muffler-filter apparatus, such as apparatus 28 installed in an exhaust line 304 from the engine (not shown) which powers the bus. The bus operates for a period of time or for its scheduled route. When it is decided to take the bus out of service, for example, each night, it may be parked at a regeneration station 306. Station 306 includes an air line 308 leading to an air source (not shown). Air line 308 includes a plurality of valves 310. When bus 302 parks at a particular station 306, one of valves 310 is connected via line 312 in fluid communication with tube 98 of apparatus 28. Station 306 also includes processor unit 164 connected via lines 314 to an electrical power source (not shown). When bus 302 is parked at station 306, pigtail 316 places processor unit 164 in electrical communication with the various electrical attachments of apparatus 28, particularly pressure transducers 159, 160 and 170 and with heating element 92 and temperature sensing device 96. When fully connected to the air and electrical systems, apparatus 28 can be regenerated in a fashion similar to the self-contained regeneration described relative to systems 20 and 20a of FIGS. 1 and 1A.

Figure 16A:
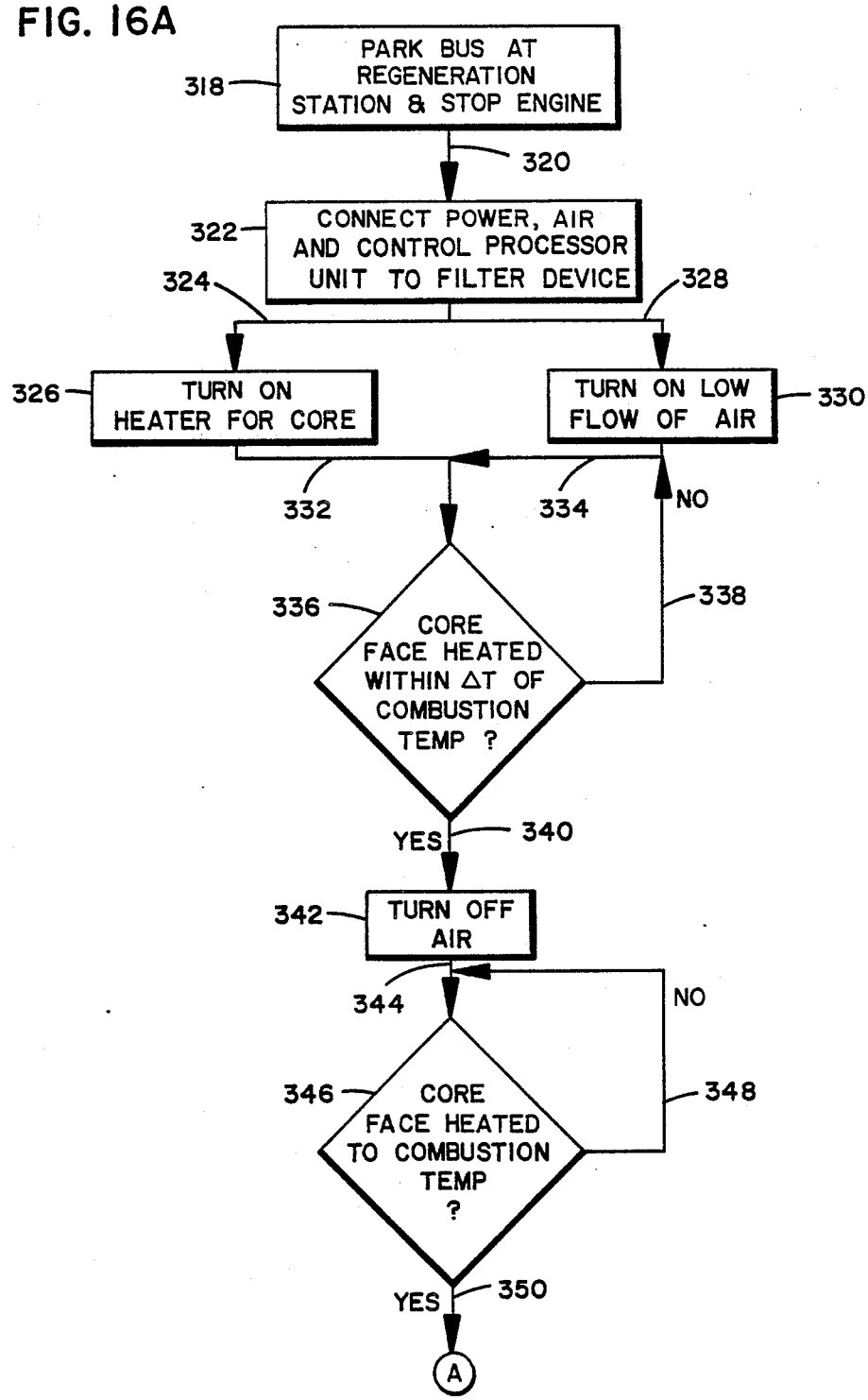
FIGS. 16A–B show a logic diagram for using the exhaust system depicted in FIG. 15.
Figure 16B:
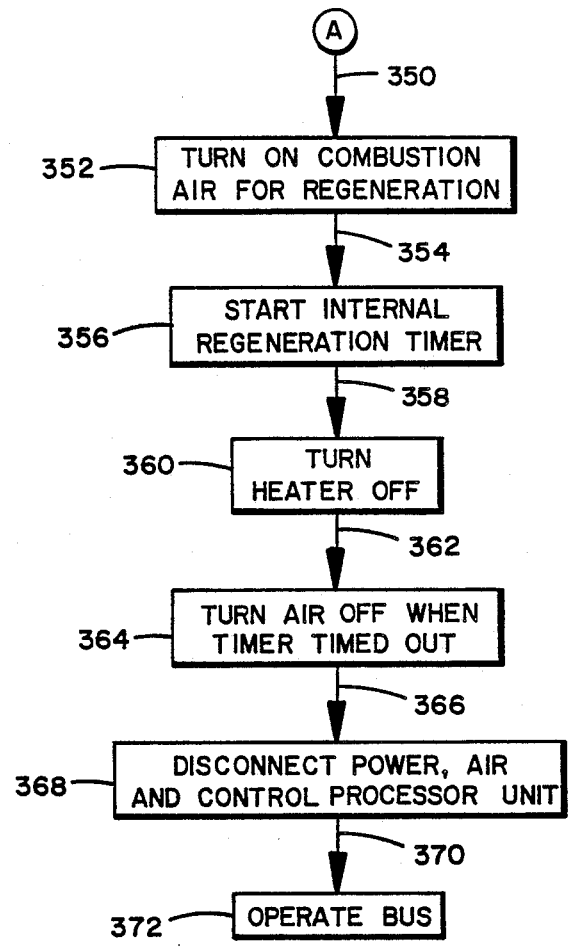

The method of use then of muffler-filter apparatus in accordance with the present invention wherein it is used on a vehicle like a bus for a time period, which time period may be variable, and then parked for connection to regeneration equipment for the purpose of regeneration is shown in FIGS. 16A-B. The method begins with step 318 which is to park the bus or other vehicle at a regeneration station. As shown by line 320 to step 322, electrical power, the air source and the control processor unit are connected to the muffler-filter apparatus at station 306. Thereafter, as shown by line 324 to step 326, heat is turned on for directing radiation toward the input end of the core of the filter. As discussed hereinbefore, and as shown by line 328 leading to step 330, a low flow of air is preferably turned on at about the same time. It is noted, however, that although it is preferable, the low flow of air is not needed. In either case, as shown by lines 332 and 334 leading to decision step 336, the temperature sensing device 96 in conjunction with processor unit 164 determines whether the core face is heated to within a predetermined temperature less than the combustion temperature of the particulates in the filter. If it is not, temperature sensing continues as indicated by line 338. When the core face temperature rises to within the predetermined temperature differential, than as indicated by line 340 to step 342, the low flow of air is turned off. As indicated by line 344 leading to decision step 346, heating continues until the core face is heated to the combustion temperature. As shown by line 348, sensing of the temperature of or near the core face continues until it is at least equal to the combustion temperature. In this regard, it is noted that the temperature of the heating element or the mechanism between the core face and the heating element may be sensed rather than the temperature of the core face. If necessary, a factor can be used to relate such other temperatures to the core temperature.

As shown by line 350 leading to step 352 through bubble A which shows a transition from FIG. 16A to 16B, after the appropriate core face temperature is sensed, an appropriate flow rate of air for combustion of the particulates in the filter is turned on. Preferably, as indicated by line 354 leading to step 356, at about the same time an internal regeneration timer is started. After the combustion temperature for the core face is sensed, and preferably after combustion air is turned on and the timer started, as indicated by line 358 leading to step 360, the heater is turned off. It is understood that the timer times for a period which allows for complete burning of the particulates in the ceramic filter element. As indicated by line 362 leading to step 364, when the timer has timed out, combustion air is turned off. Thereafter, as indicated by line 366 leading to step 368, the power, air, and control processor unit are disconnected, so that, as indicated by line 370 leading to step 372, the bus or other vehicle may be placed back in operation.

Another alternate embodiment of an exhaust system is shown in FIGS. 17-21. In particular, in FIG. 17 an earth moving machine 374 is shown to include filter apparatus 376 at the end of exhaust pipe 378. Apparatus 376 is shown in greater detail in FIG. 18. Apparatus 376 includes a filter module 90 having cone-shaped, exhaust gas directing ends 380 on opposite ends. An end 380 includes a cone 382, a connecting cylinder 384, and a cylindrical V-clamp 386 to hold the two together. Cone 382 has a bracket 388 extending away from the cone surface in a direction perpendicular to the axis of cone 382. Brackets 388 at both ends of apparatus 376 are fastened with nut and bolt combinations to mating brackets on machine 374. A flange (not shown) at the larger end of cone 382 is shaped as appropriate for being received by clamp 386.

Connecting cylinder 384 is slightly enlarged at the end 390 which receives module 90. There is a flange (not shown) opposite end 390 shaped for being received by clamp 386.

When brackets 388 are secured, module 90 is also secured between end members 380. Exhaust gasses are then directed from exhaust pipe 378 through an end member 380, module 90 and the other member 380. Periodically, module 90 is replaced so that a clean module may be installed and a module having collected particulates may be regenerated.

Module 90 is removed by removing both clamps 386 and taking each of connecting cylinders 384 off module 90. Installation is accomplished by reversing the steps. That is, connecting cylinders 384 are installed on module 90 and clamps 386 are tightened to hold cones 382 and connecting cylinders 384 together.

Figure 19:
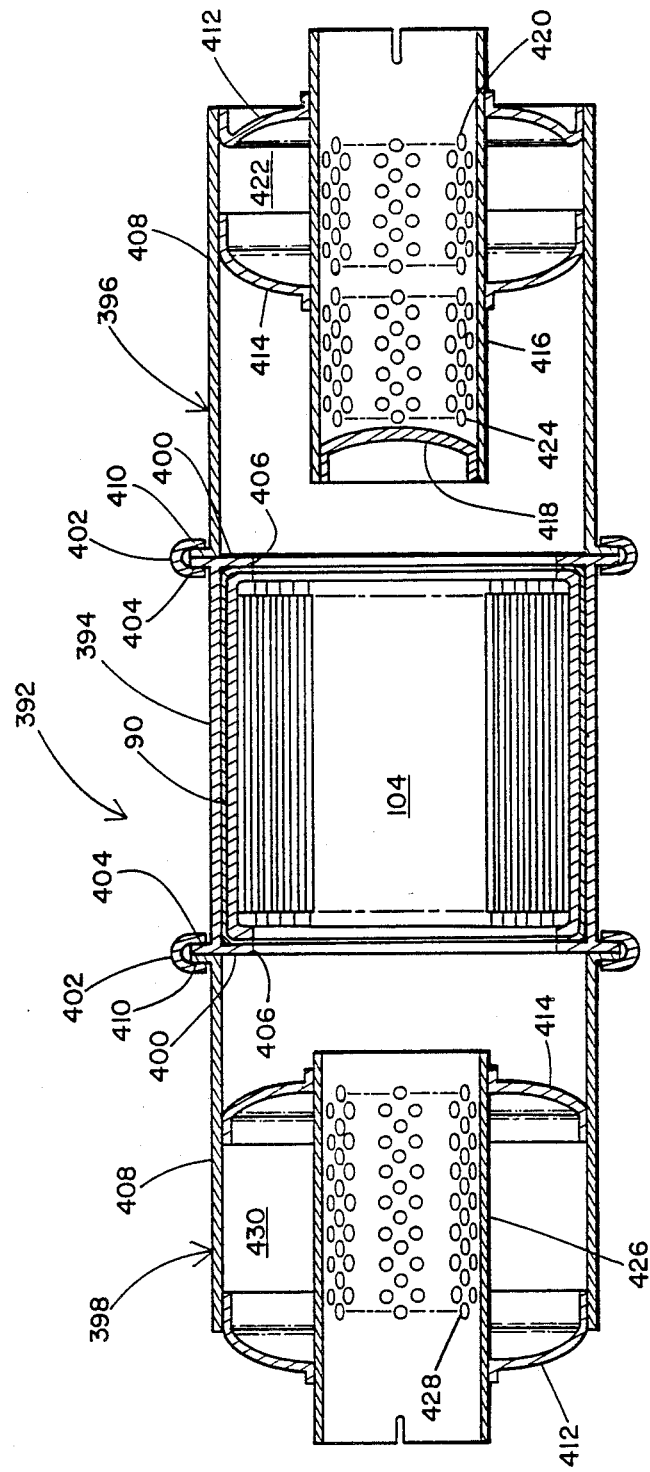
FIG. 19 is a cross-sectional view of an alternate embodiment muffler-filter apparatus where the filter is removeable for regeneration elsewhere.

An alternate embodiment of apparatus 376 is shown in FIG. 19 as apparatus 392. Apparatus 392 includes a module 90 received in a central portion 394 which mates with one of end portions 396 and 398 and a retaining ring 400, all of which are held together by clamps 402.

Central portion 394 is cylindrical and has a diameter slightly larger than module 90. A flange 404 is formed outwardly at each end of central portion 394. Central portion 394 has a length approximately the same of that of module 90.

Retaining rings 400 extend outwardly as far as flanges 404 and extend inwardly to provide a surface at the opposite ends of module 90 so as to retain module 90 therebetween. The central opening 406 of retaining rings 400 exposes essentially all of the inlet and outlet ends of core 104 of module 90.

Each of end portions 396 and 398 includes a reactive attenuation chamber in the form of a resonating chamber. It is noted that the concept of apparatus 392 is for at least one of end chambers 396 and 398 to include a reactive attenuation chamber. That is, one of the end portions would not have to include such a chamber. In other words, one of the end portions could be formed like an end member 380 of apparatus 376. As shown, however, each of end portions 396 and 398 include a cylindrical housing 408 having a flange 410 which is similar to flanges 404 so that one of flanges 404 and 410 and a retainer ring 400 therebetween are received and held by a clamp 402. Each end portion includes an end wall 412 and an interior baffle member 414. As with similar structure for apparatus 28, the end walls 412 and interior baffle members 414 are formed to have outer circular flanges fastened to housings 408 and inner circular flanges forming an axially aligned opening. An inlet pipe 416 is attached to and held by the inner circular flanges of an end wall 412 and an interior baffle member 414 of inlet end chamber 396. One end of inlet pipe 416 opens to the exterior and is intended to be fastened to a pipe in fluid communication with the engine. The other end is plugged with a stop 418 in a fashion similar to apparatus 28. Inlet pipe 416 has a first set of perforations 420 opening into chamber 422 and a second set of perforations 424 opening into a space between interior baffle member 414 and module 90. In this way, chamber 422 is a reactive attenuation chamber in the form of a resonating chamber.

In a similar fashion, an outlet pipe 426 is attached to and held by the inner circular flanges of the end wall 412 and interior baffle member 414 of outlet end portion 398. Outlet pipe 426 includes a third set of perforations 428 which open into chamber 430 between end wall 412 and interior baffle member 414. Thus, chamber 430 also functions as a resonating chamber. In addition, the space between interior baffle members 414 which includes module 90 functions as a third reactive attenuation chamber in the form of an expansion chamber.

If apparatus 392 replaced apparatus 376 with respect to a machine 374, the end portions 396 and 398 could be attached to machine 374 in a fashion similar to the mechanism for attaching apparatus 376 to machine 374. Loosening of clamps 402 allows for removal of central portion 394 so that module 90 may be slid therefrom. In similar fashion, a regenerated module 90 may be slid thereinto so that the central portion may be reinstalled and apparatus 392 placed back in use in a rapid fashion with a completely clean filter.

Figure 20:
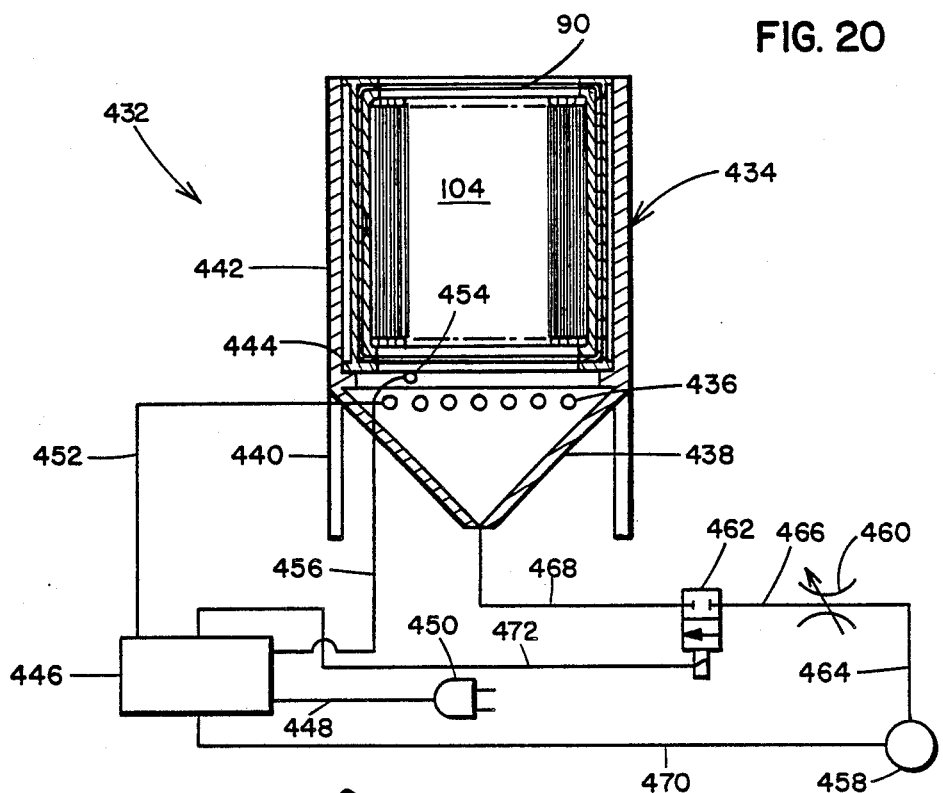
FIG. 20 is an illustration of a regeneration station for a ceramic filter separated from the housing therefore.
Figure 15:
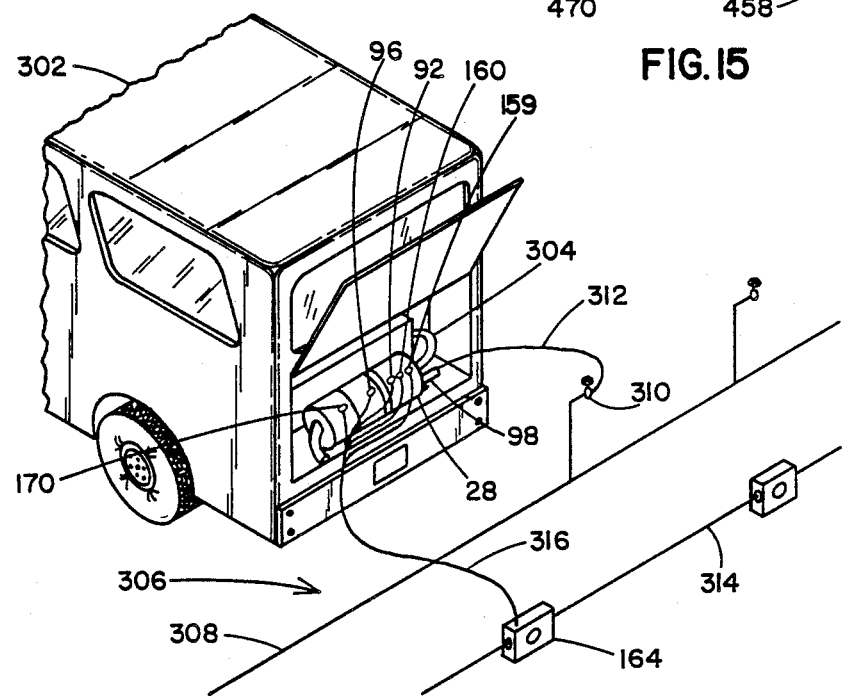
FIG. 15 illustrates a bus having a muffler-filter apparatus in accordance with the present invention parked at a regeneration station.

A module 90 which is at least partially loaded with particulates after having been used in the fashion anticipated for apparatuses 376 and 392, is regenerated using an apparatus 432 like that depicted in FIG. 20. Apparatus 432 includes a stand 434 for holding module 90. The lower end of stand 434 supports a heating element 436 which heats, primarily by radiation, an end of module 90. The lower end of stand 434 also includes a plenum or air directing cone 438 so that combustion air communicated into cone 438 may expand and flow through the entire cross-sectional area of core 104 of module 90.

A representative stand 434 includes a plurality of legs 440 supporting a fixture 442 for holding module 90. Fixture 442 includes a ring 444 or other supporting surface to hold module 90 above heating element 436. Cone 438 extends beneath support ring 444. Air is directed into the apex at the bottom of cone 438 for expansion so that when it passes through heating element 436, it flows against the entire face of core 104.

The control mechanism of apparatus 432 includes a processor unit 446. Processor unit 446 is connected via line 448 to an electrical source as depicted by plug 450. The processor unit is connected to heating element 436 via line 452. Processing unit 446 thus controls when heating element 436 is on or off and functions to maintain a temperature level. A temperature sensing device 454, for example a thermocouple, senses the temperature of one of the face of core 104, heating element 436, or the medium between heating element 436 and the face of core 104. Temperature sensing device 454 is connected to processor unit 446 via line 456. Combustion air is supplied to cone 438 from an air source 458 via a flow control valve 460 and a two-way two-position solenoid valve 262 connected in series by lines 464, 466 and 468. Air source 458 is controlled by processor unit 446 via line 470. Solenoid valve 462 is controlled by processor unit 446 via line 472.

Figure 21B:
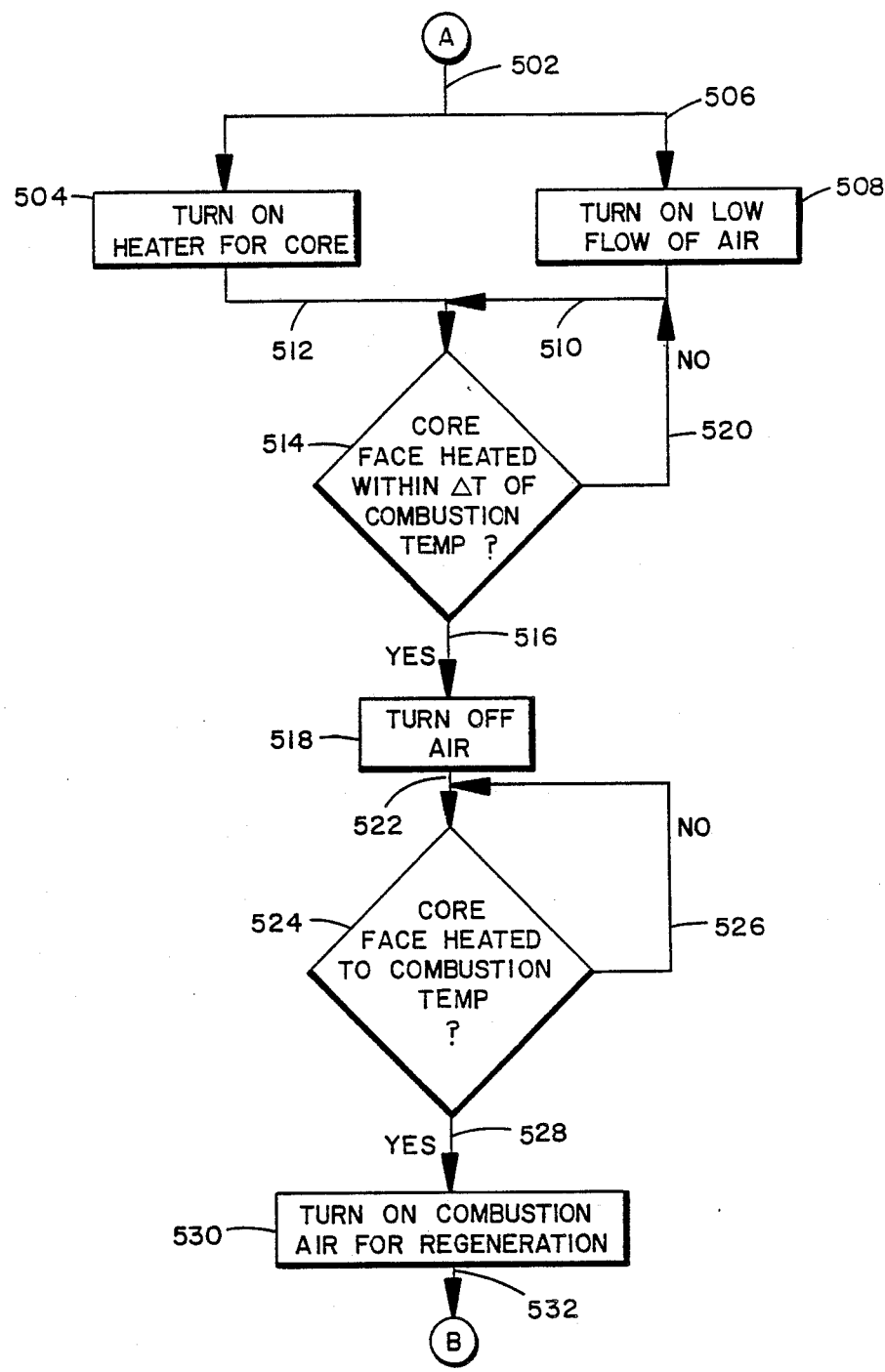
Figure 21C:
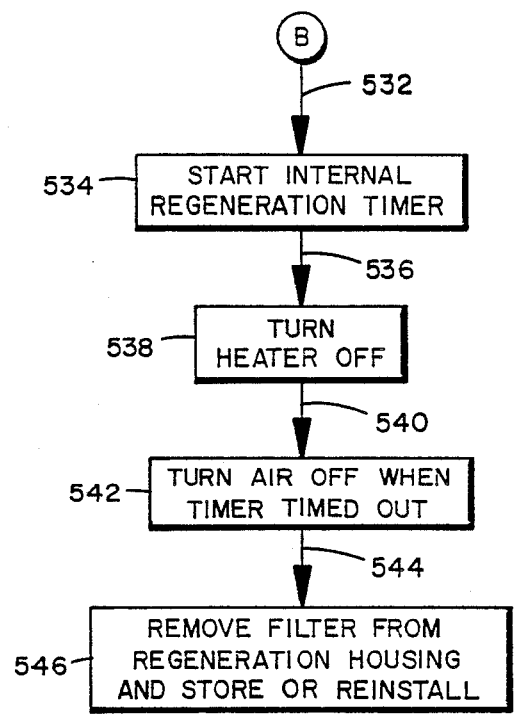

The method of using and regenerating a filter module 90 in accordance with the concept described with respect to FIGS. 17-20 is illustrated in the flow diagram of FIGS. 21A-C. As indicated by step 474, first a filter module is installed on a vehicle, like machine 374. The filter module may be used for a specific period of time or, alternately, differential pressures may be monitored as described with respect to apparatus 28 and as illustrated by steps 478, 482, 486 and 490 on the flow chart in FIG. 12A. That is, with reference to the latter, as shown by the line 476 leading to step 478, a baseline differential pressure is read. Then, as indicated by line 480 leading to step 482, the trap differential pressure is read. As indicated by line 484 leading to step 486, a ratio of the baseline differential pressure to the trap differential pressure is calculated, and as indicated by line 488 leading to decision step 490, if the ratio is greater than a predetermined limit, the filter is ready for regeneration. If the ratio is less than the predetermined limit, than as indicated by line 492, the pressure sensing continues. If step 490 indicates that regeneration is needed, then as indicated by line 494 leading to step 496, the filter is allowed to cool so that it can be removed from the vehicle.

The particulate loaded filter is then placed in a regeneration housing, like apparatus 432, as indicated by line 498 leading to step 500. In a fashion similar to previously discussed regeneration methods, the loaded filter module is then regenerated by heating an end to combustion temperature and supplying it with combustion air to initiate a flame. More particularly, as indicated by line 502 through bubble A which leads to step 504, the heating element for radiating heat to the face of the core is turned on. At the same time, it is preferable, although not necessary, to turn on a low flow of air as indicated by line 506 leading to step 508 which is in parallel to step 504. As indicated by lines 510 and 512 leading to decision step 514, when the core face is heated to within a temperature differential of the combustion temperature of the particulates therein, then as indicated by line 516 leading to 518, the air is turned off. As shown by line 520, if the temperature differential of the core face with respect to the combustion temperature is greater than the predetermined value, then the low flow of air continues while heating continues. In this regard, it is noted as before that even though the temperature of the core face is indicated to be the temperature sensed, it is understood that the temperature sensing device may sense the temperature of the heating element, the core face, or a medium therebetween. In any case, as indicated by line 522 leading to decision step 524, the temperature continues to be sensed. As indicated by line 526, as long as the temperature is less than the combustion temperature, the temperature continues to be compared to the combustion temperature. As indicated by line 528 leading to step 530, when the combustion temperature is sensed, then a greater flow of air is turned on to provide combustion air for maintaining a flame which burns the particulates in the filter core and regenerates it. After combustion air is turned on, as indicated by line 532 extending through bubble B to step 534, an internal timer is started. As indicated by line 536 leading to step 538, also after combustion air is turned on, the heating element is turned off. As indicated by line 540 leading to step 542, the air is turned off after the timer has timed out. At that point, regeneration is complete, and as indicated by line 544 to step 546, the filter may be removed from the regeneration housing and stored or reinstalled on a machine 374.

As indicated previously, steps 508, 514, and 518 are not absolutely necessary. Also, it is not necessary to use a timer as indicated by step 534. Rather, the regeneration may be physically observed and the heating element and air turned off as appropriate.

Thus, the exhaust apparatus of the present invention may be embodied in a variety of alternatives. The heart of the system, however, is a ceramic filter element module in conjunction with a muffling mechanism and mechanism for regenerating the filter element. Although the various embodiments have been described in detail and the advantages of structure and function set forth, it is understood that other equivalents may be possible as well. Therefore, it is finally understood that any changes made in structure with respect to the disclosed embodiments, especially in matters of shape, size and arrangement, to the full extent extended by the general meaning of the terms in which the appended claims are expressed, are also within the principle of the present invention.

What is claimed is:

1. A method for regenerating a ceramic filter loaded with particulates from exhaust gases of a diesel engine, said ceramic filter being mounted to a housing, said method comprising the steps of:
   turning on a heating element to radiate heat toward one end of said ceramic filter;
   turning on an air source to blow a low flow of air passed said heating element and toward said one end of said ceramic filter;
   sensing one of a temperature of said heating element, a temperature of fluid between said heating element and said ceramic filter, and a temperature of said one end of said ceramic filter and identifying a first triggering relationship when said one temperature is no less than a predetermined temperature which is less than the combustion temperature of said particulates;
   turning off said air after identifying said first triggering relationship;
   sensing said one temperature and identifying a second triggering relationship when said one temperature is no less than the combustion temperature of said particulates;
   turning on said air source after identifying said second triggering relationship to blow a regular flow of air passed said heating element and toward said one end of said ceramic filter;
   starting a timer after identifying said second triggering relationship;
   turning said heating element off after identifying said second triggering relationship; and
   turning said air source off after said timer has timed out.

2. The method in accordance with claim 1 including before the step which turns on the heating element, the steps of parking a vehicle to which said housing is attached and then connecting an electrical power source to said heating element, connecting an air source to said housing for directing air past said heating element and said ceramic filter, and connecting a temperature sensor for sensing said one temperature to control means for controlling said power and air sources.

3. The method in accordance with claim 2 including after the step which turns the air off after the timer has timed out the steps of disconnecting said electrical power source, said air source and said temperature sensor and then operating said vehicle.

4. The method in accordance with claim 1 including before the step which turns on the heating element the steps of:
   with said housing mounted on a vehicle, directing said exhaust gases through said ceramic filter;
   sensing a baseline pressure differential upstream from the one end of said ceramic filter along a flow path for said exhaust gases;
   sensing a loading pressure differential across said ceramic filter;
   calculating a ratio of base line pressure differential to loading pressure differential and identifying a third triggering relationship when said ratio is greater than a predetermined value.

5. The method in accordance with claim 4 including after identifying said third triggering relationship, sensing said one temperature and when said one temperature is greater than a predetermined low limit, closing with valve means the flow of said exhaust gases to said ceramic filter.

6. The method in accordance with claim 5 including opening said valve means after said timer has timed out.

7. The method in accordance with claim 4 including after identifying said third triggering relationship, removing said ceramic filter from the housing on said vehicle and placing said ceramic filter in a regeneration housing.

8. The method in accordance with claim 7 including after said timer has timed out removing said regenerated ceramic filter from said regeneration housing and reinstalling in said housing on said vehicle.

* * * * *

UNITED STATES PATENT AND TRADEMARK OFFICE
CERTIFICATE OF CORRECTION

PATENT NO. : 4,899,540

DATED : February 13, 1990

INVENTOR(S) : Wayne M. Wagner and Douglas E. Flemming

It is certified that error appears in the above-identified patent and that said Letters Patent is hereby corrected as shown below:

Column 2, line 54, insert--being--after "before".

Column 3, line 39, "import" should be--importance--.

Column 5, line 24, "to" should be--of--.

Column 5, lines 29 and 31, after "of" insert--a--.

Column 5, line 39, after "of" insert--a--.

Column 5, line 52, after "embodiment" insert--of a--.

Column 6, line 67, after "to" insert--the--.

Column 7, line 65, after "pipes" delete ",".

Column 8, line 46, after "example" insert--,--.

Column 12, line 47, "bubble" should be--circle--; after "B" insert--(which shows where Figures 12A and 12B connect)--.

Column 12, line 59, "210" should be--209--.

Column 14, line 33, after "as" insert--to--.

UNITED STATES PATENT AND TRADEMARK OFFICE
CERTIFICATE OF CORRECTION

PATENT NO. : 4,899,540

DATED : February 13, 1990

INVENTOR(S) : Wayne M. Wagner and Douglas E. Flemming

It is certified that error appears in the above-identified patent and that said Letters Patent is hereby corrected as shown below:

Column 15, line 64, "bubble" should be --circle--.

Column 18, line 46, "bubble" should be --circle--.

Column 16, line 56, "of" should be --as--.

Column 18, line 4, after "for example" insert --,--.

Column 19, line 7, "bubble" should be --circle--.

Signed and Sealed this

Eighteenth Day of May, 1993

Attest:

MICHAEL K. KIRK

Attesting Officer

Acting Commissioner of Patents and Trademarks